US012181783B2

(12) United States Patent
Toriyama et al.

(10) Patent No.: US 12,181,783 B2
(45) Date of Patent: Dec. 31, 2024

(54) OPTICAL PHASE MODULATION ELEMENT AND DISPLAY APPARATUS

(71) Applicant: SONY GROUP CORPORATION, Tokyo (JP)

(72) Inventors: Akiko Toriyama, Tokyo (JP); Takahiro Mochizuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/042,049

(22) PCT Filed: Aug. 13, 2021

(86) PCT No.: PCT/JP2021/029845
§ 371 (c)(1),
(2) Date: Feb. 17, 2023

(87) PCT Pub. No.: WO2022/050028
PCT Pub. Date: Mar. 10, 2022

(65) Prior Publication Data
US 2023/0400755 A1     Dec. 14, 2023

(30) Foreign Application Priority Data
Sep. 2, 2020    (JP) ................. 2020-147720

(51) Int. Cl.
*G03B 21/00*    (2006.01)
*G02F 1/1337*   (2006.01)

(52) U.S. Cl.
CPC ......... *G03B 21/006* (2013.01); *G02F 1/1337* (2013.01)

(58) Field of Classification Search
CPC ..................... G02F 1/1337; G03B 21/006
See application file for complete search history.

(56) References Cited

U.S. PATENT DOCUMENTS

| 2009/0244415 | A1* | 10/2009 | Ide ............... G02F 1/1313 349/33 |
| 2011/0025953 | A1* | 2/2011 | Akao ............. G02F 1/133636 349/194 |
| 2014/0284570 | A1* | 9/2014 | Jinta ............. H10K 59/352 257/40 |
| 2020/0041835 | A1* | 2/2020 | Asamizu ........ G02F 1/133512 |
| 2021/0088829 | A1* | 3/2021 | Igeta ............. G06F 1/1656 |

FOREIGN PATENT DOCUMENTS

| JP | 04-293075 A | 10/1992 |
| JP | 2008-089686 A | 4/2008 |
| JP | 2008-292725 A | 12/2008 |
| JP | 2019-158962 A | 9/2019 |
| WO | 2020/054270 A1 | 3/2020 |

OTHER PUBLICATIONS

International Search Report and Written Opinion of PCT Application No. PCT/JP2021/029845, issued on Nov. 2, 2021, 10 pages of ISRWO.

* cited by examiner

*Primary Examiner* — Mariam Qureshi
(74) *Attorney, Agent, or Firm* — CHIP LAW GROUP

(57) ABSTRACT

An optical phase modulation element of the present disclosure includes a plurality of divided regions provided in different regions in an in-plane direction and encapsulating a liquid crystal material having a different refractive index anisotropy, in which the plurality of divided regions each displays a phase distribution pattern for a color having a different wavelength.

12 Claims, 35 Drawing Sheets

[FIG. 1]
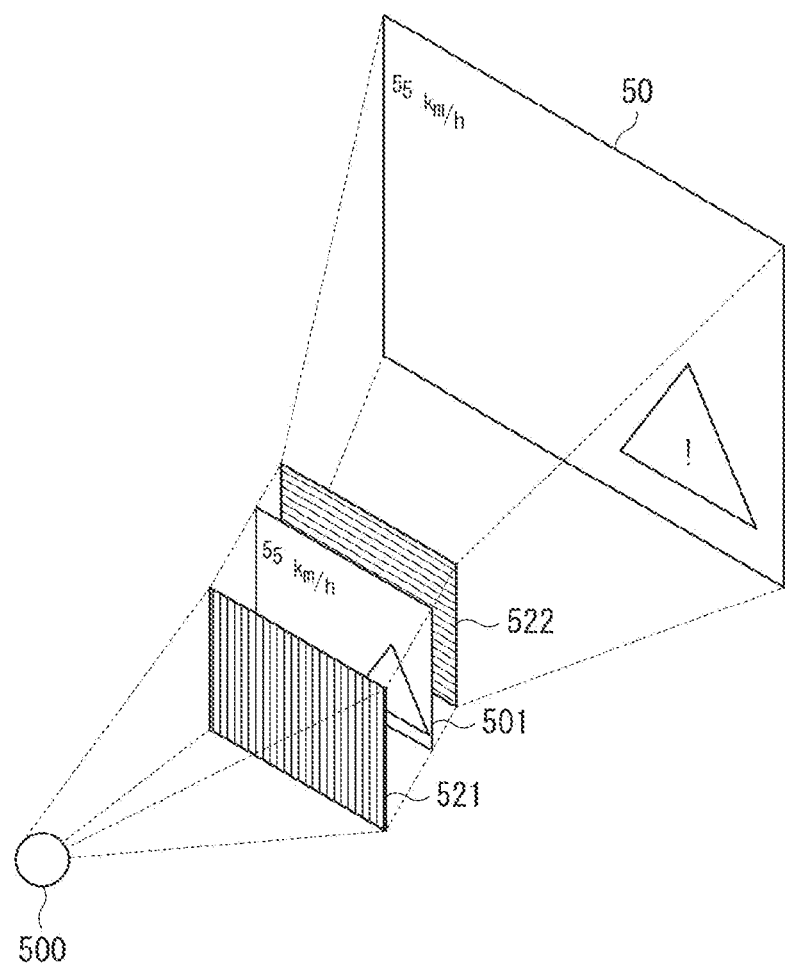

[FIG. 2]
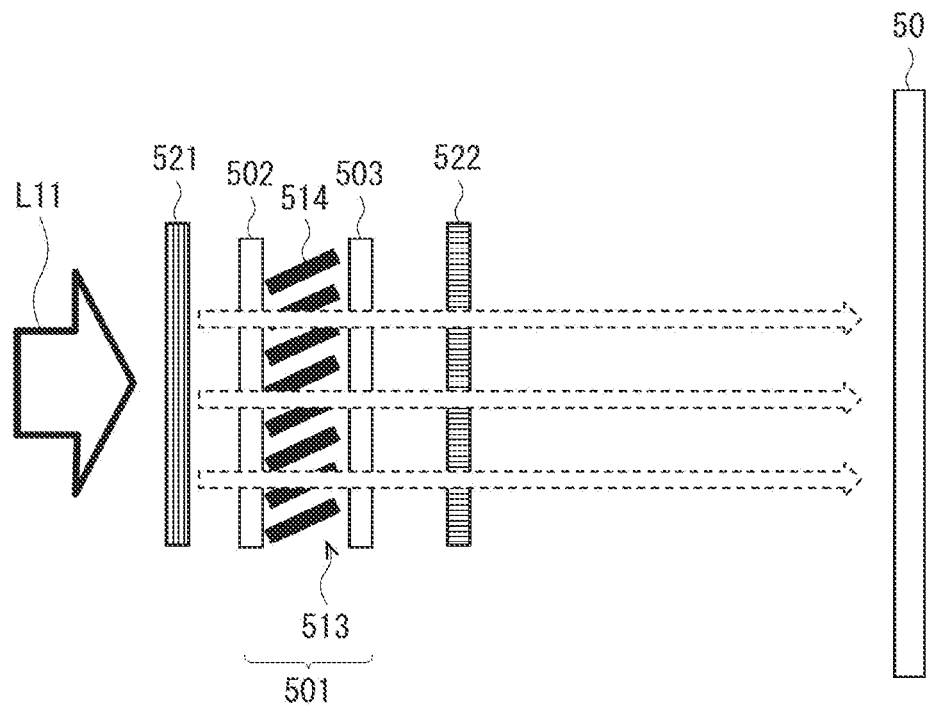
[FIG. 3]
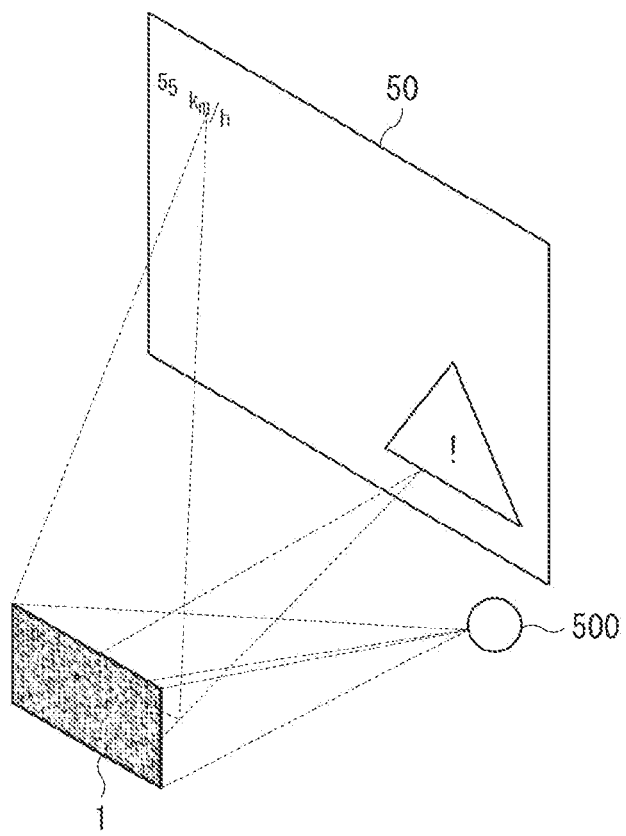

[FIG. 4]
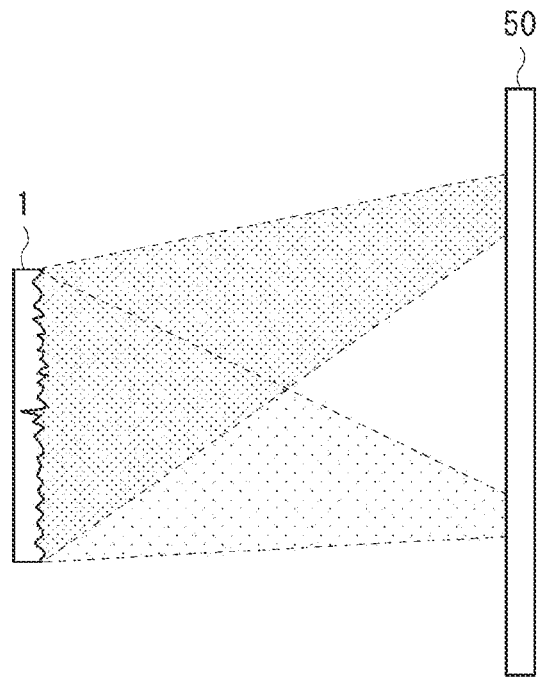
[FIG. 5]
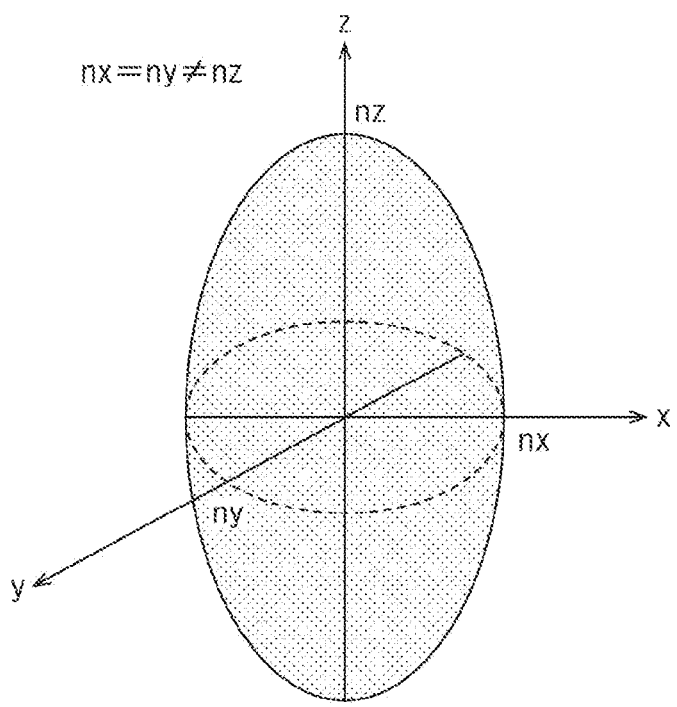

[FIG. 6]
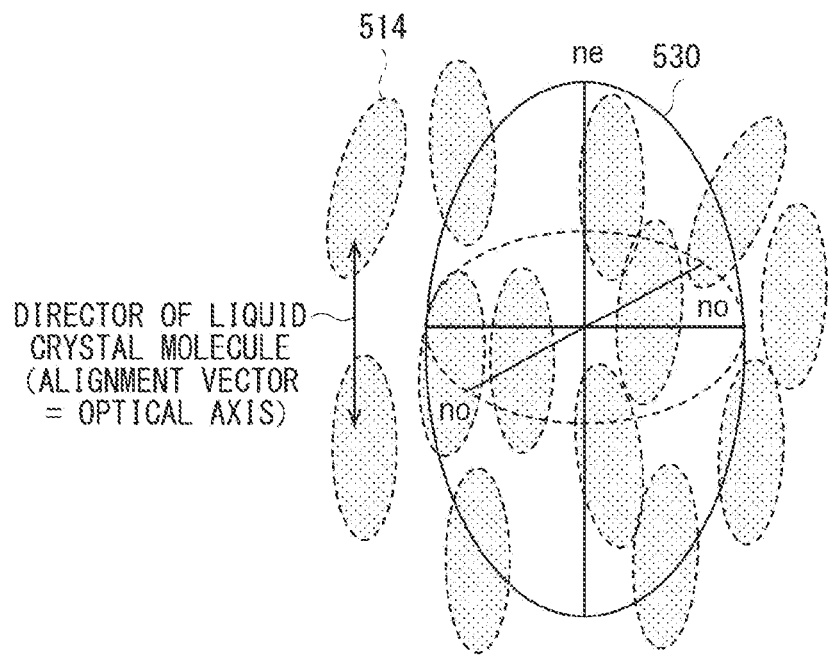
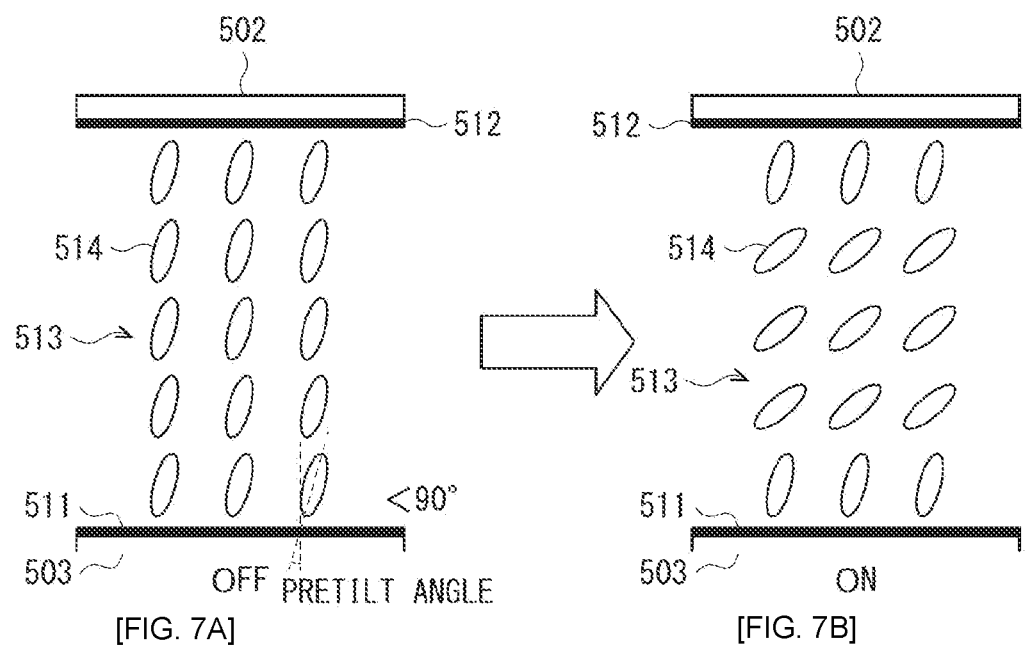
[FIG. 7A]    [FIG. 7B]

[FIG. 8]
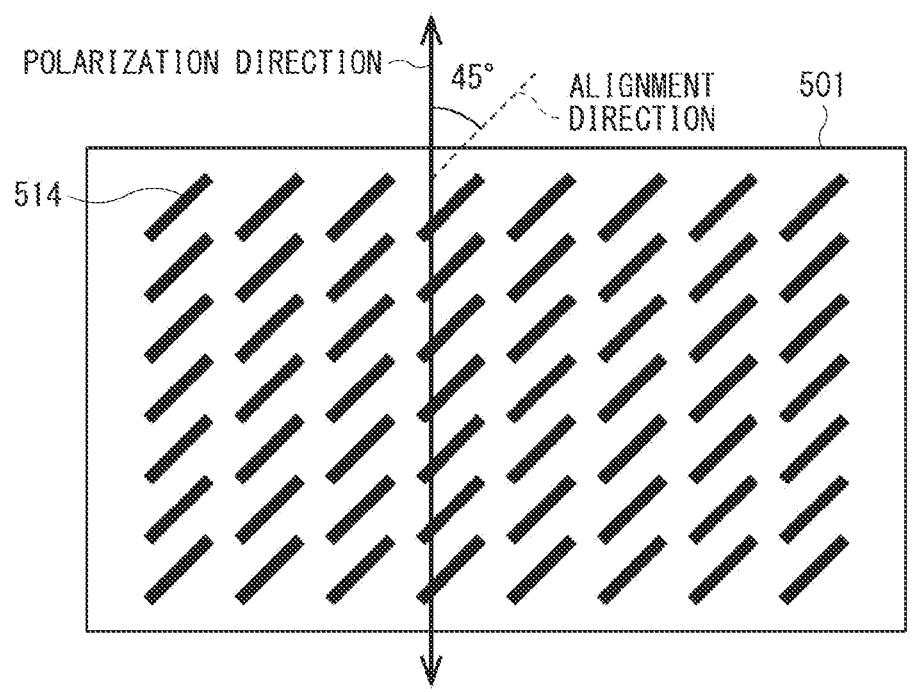

[FIG. 9]
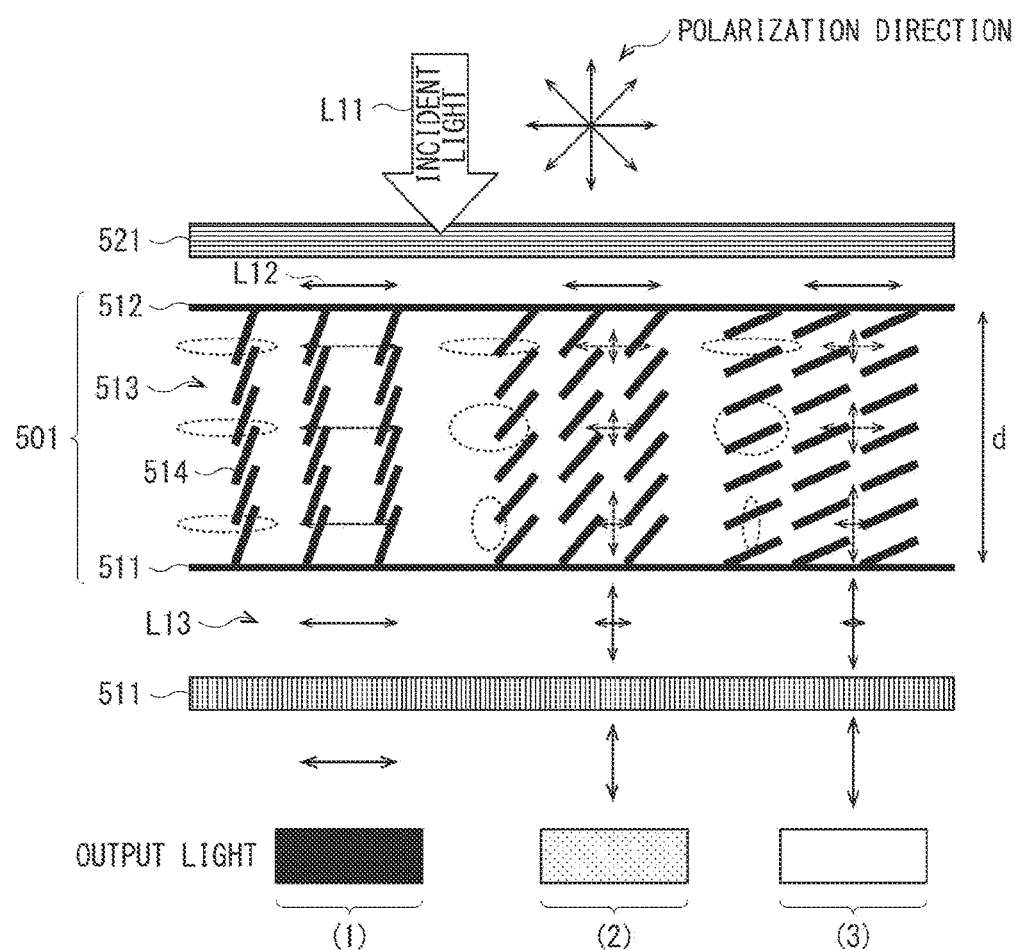

[FIG. 10]

[FIG. 11]
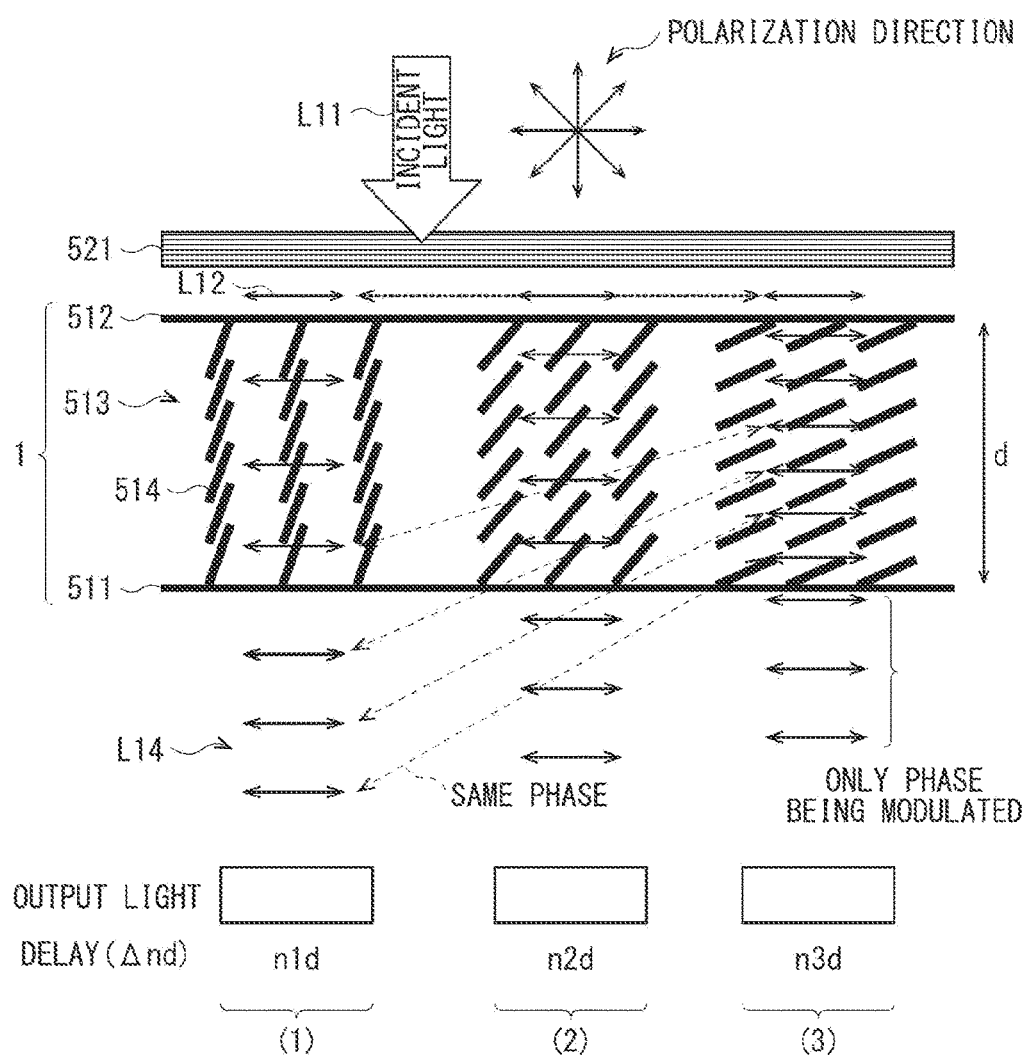

[FIG. 12]
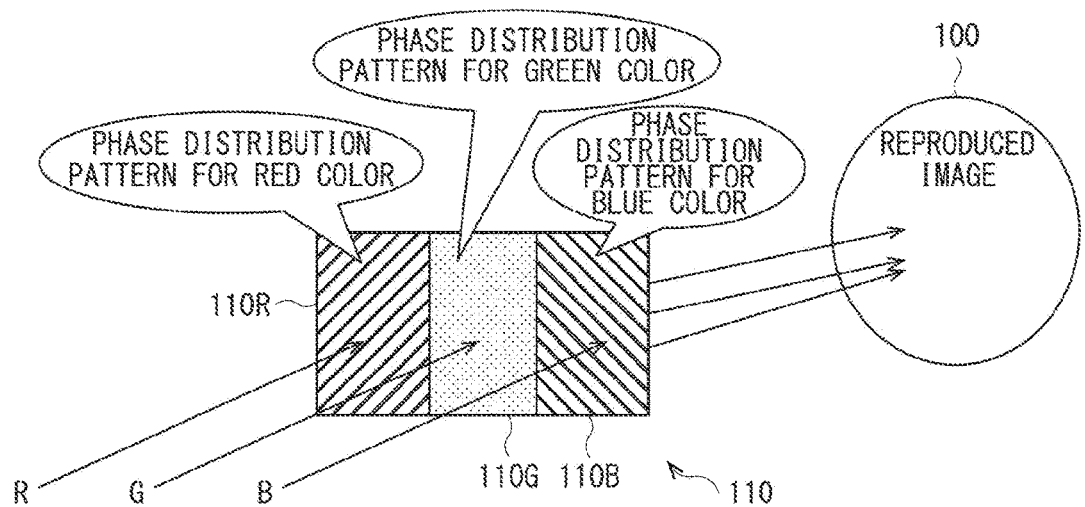
[FIG. 13]
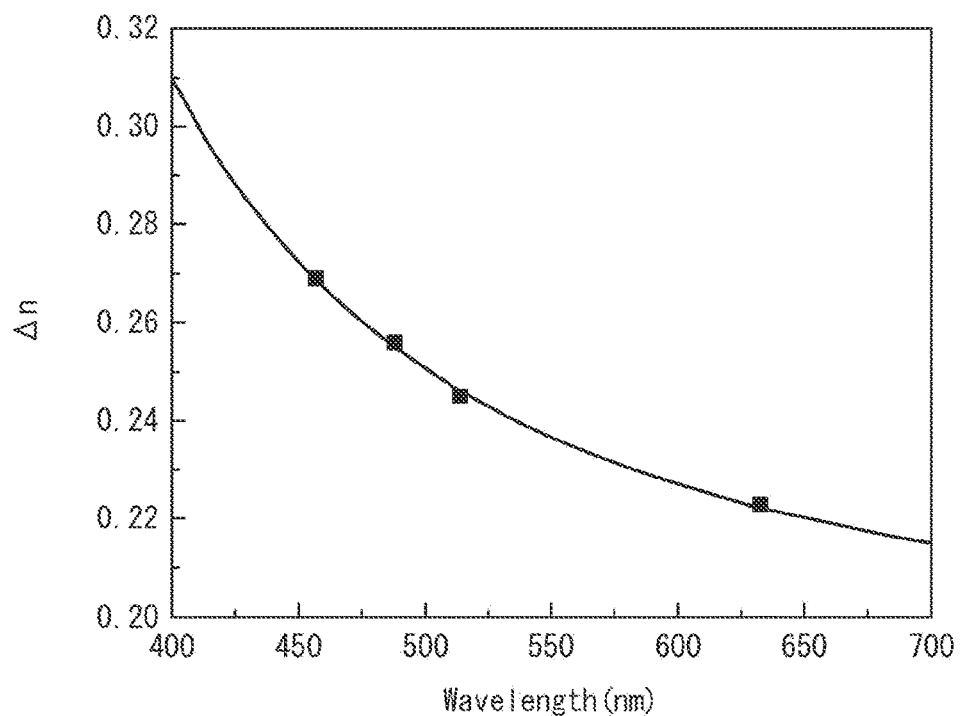

[FIG. 14]
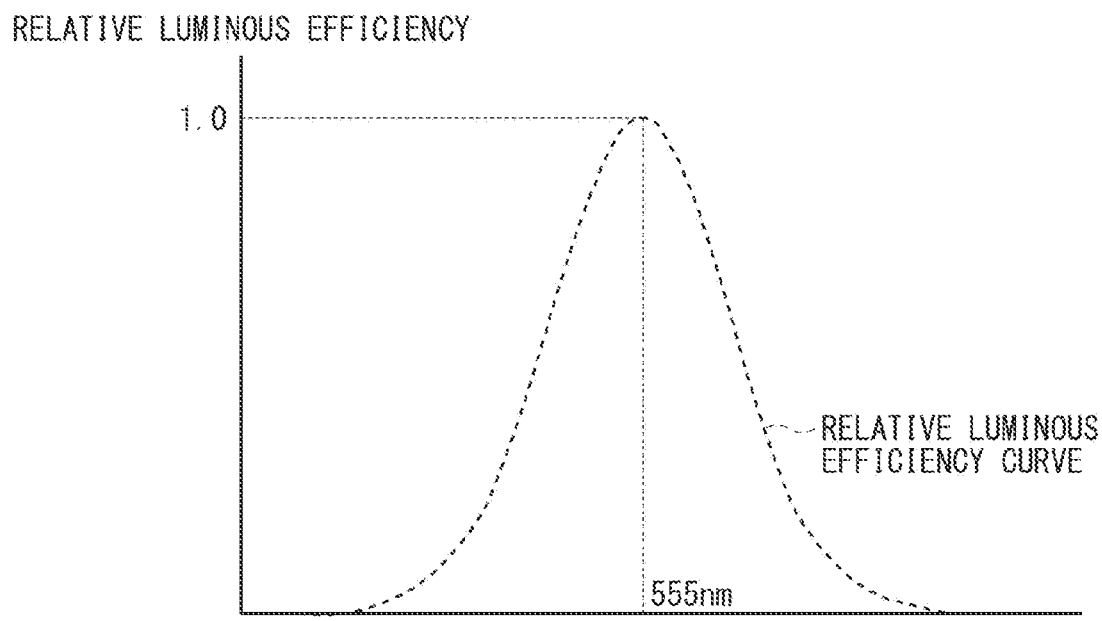
[FIG. 15]
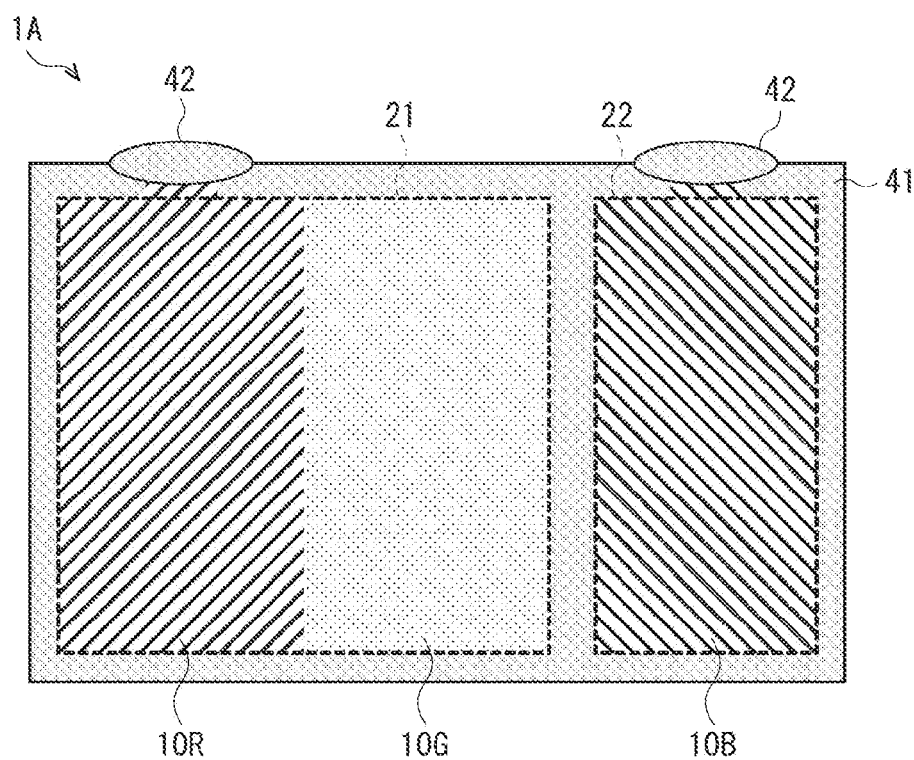

[FIG. 16]
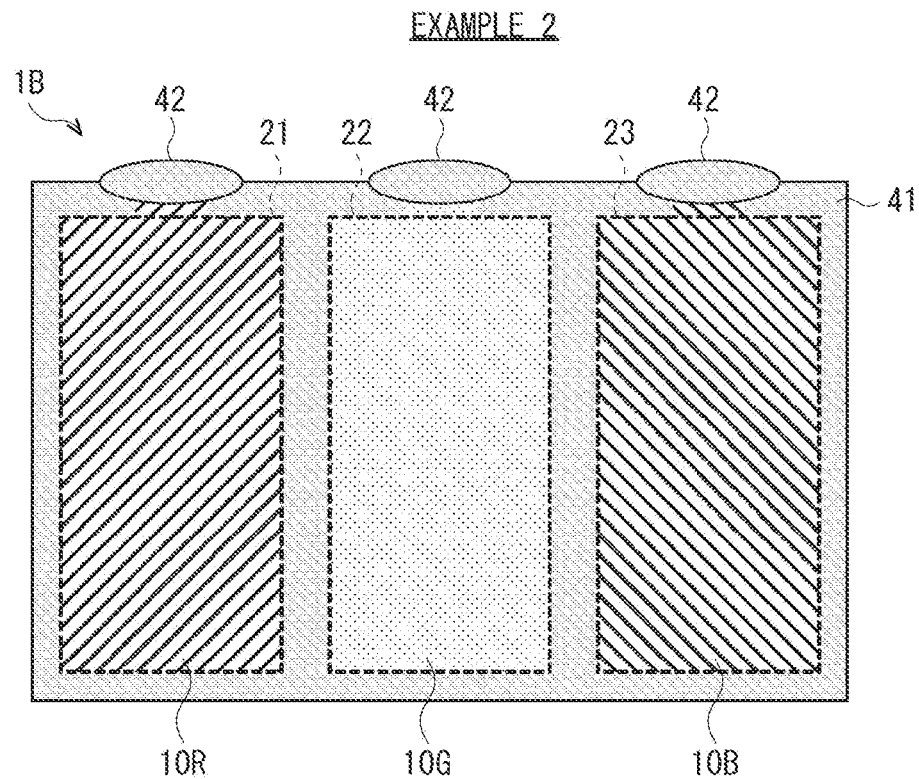
[FIG. 17]
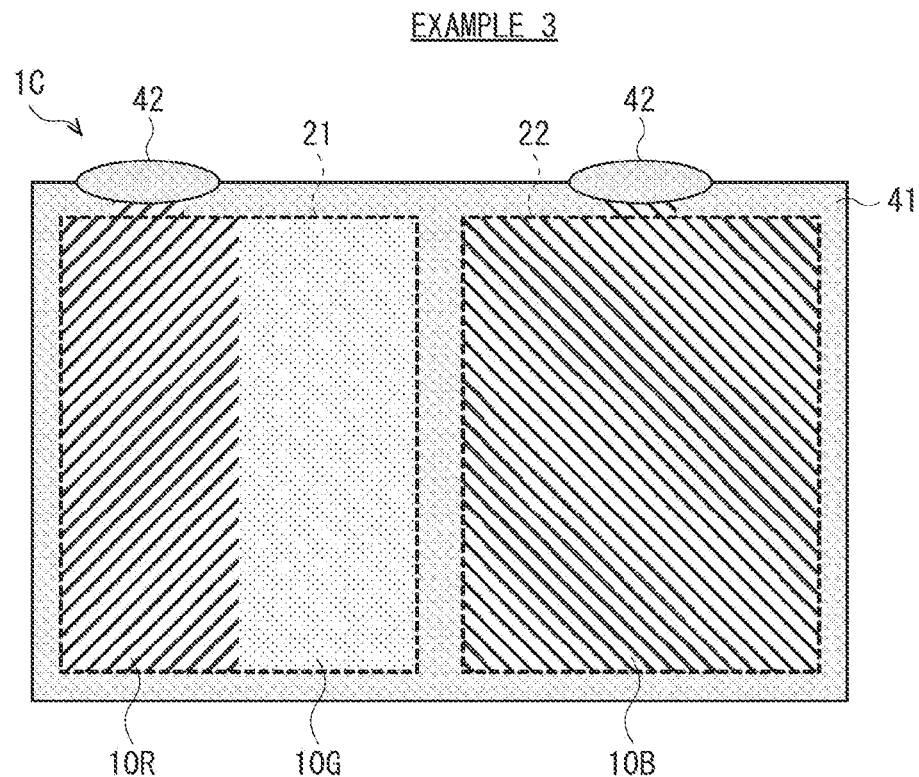

[FIG. 18]
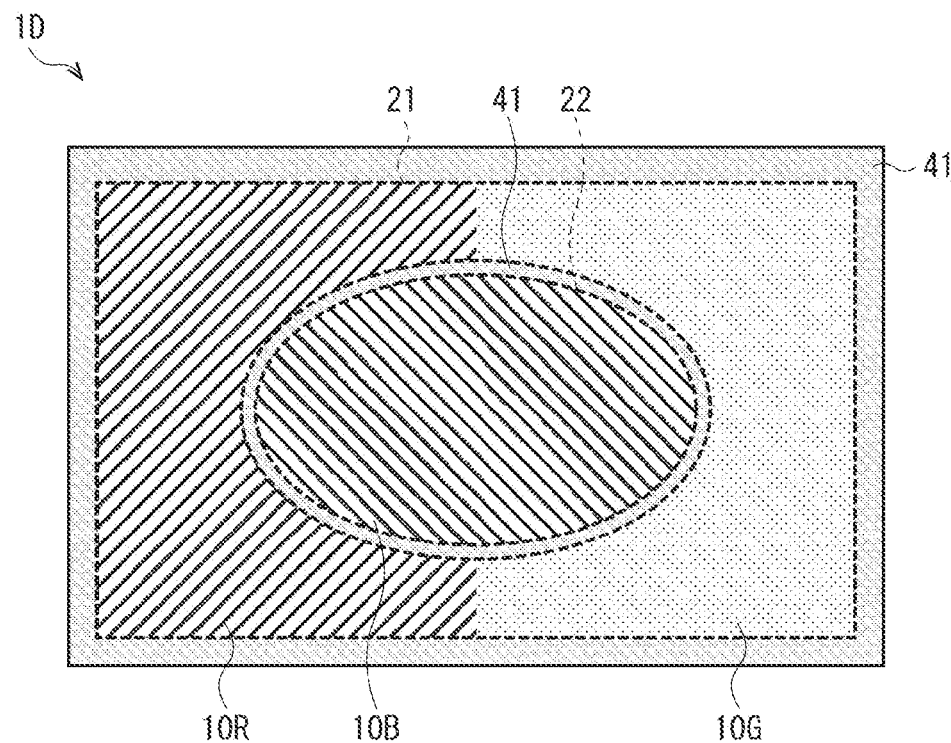
[FIG. 19]
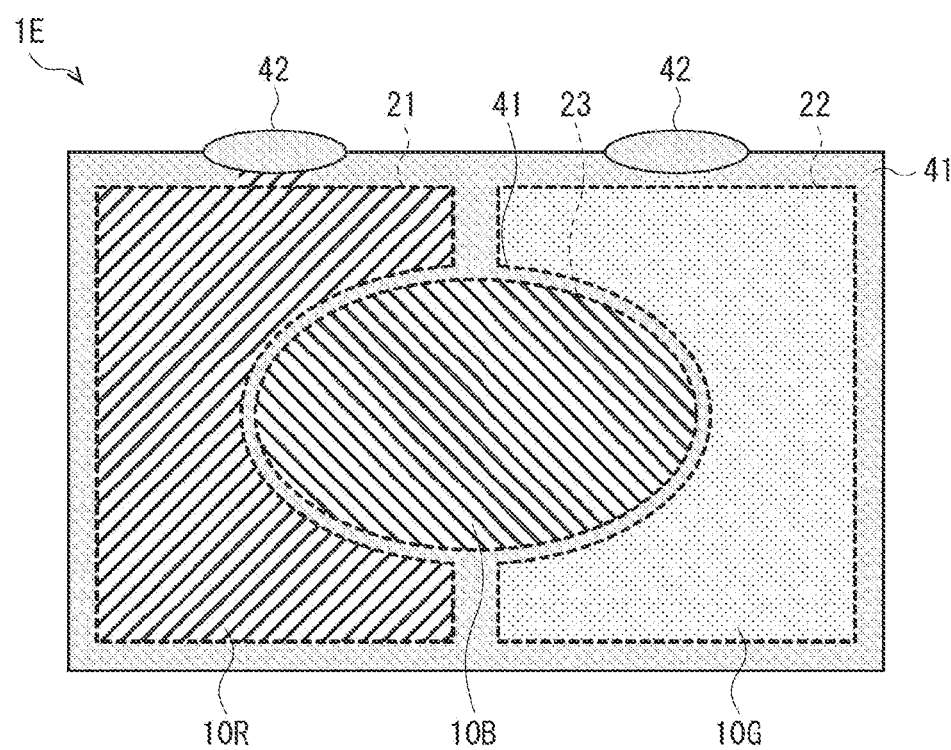

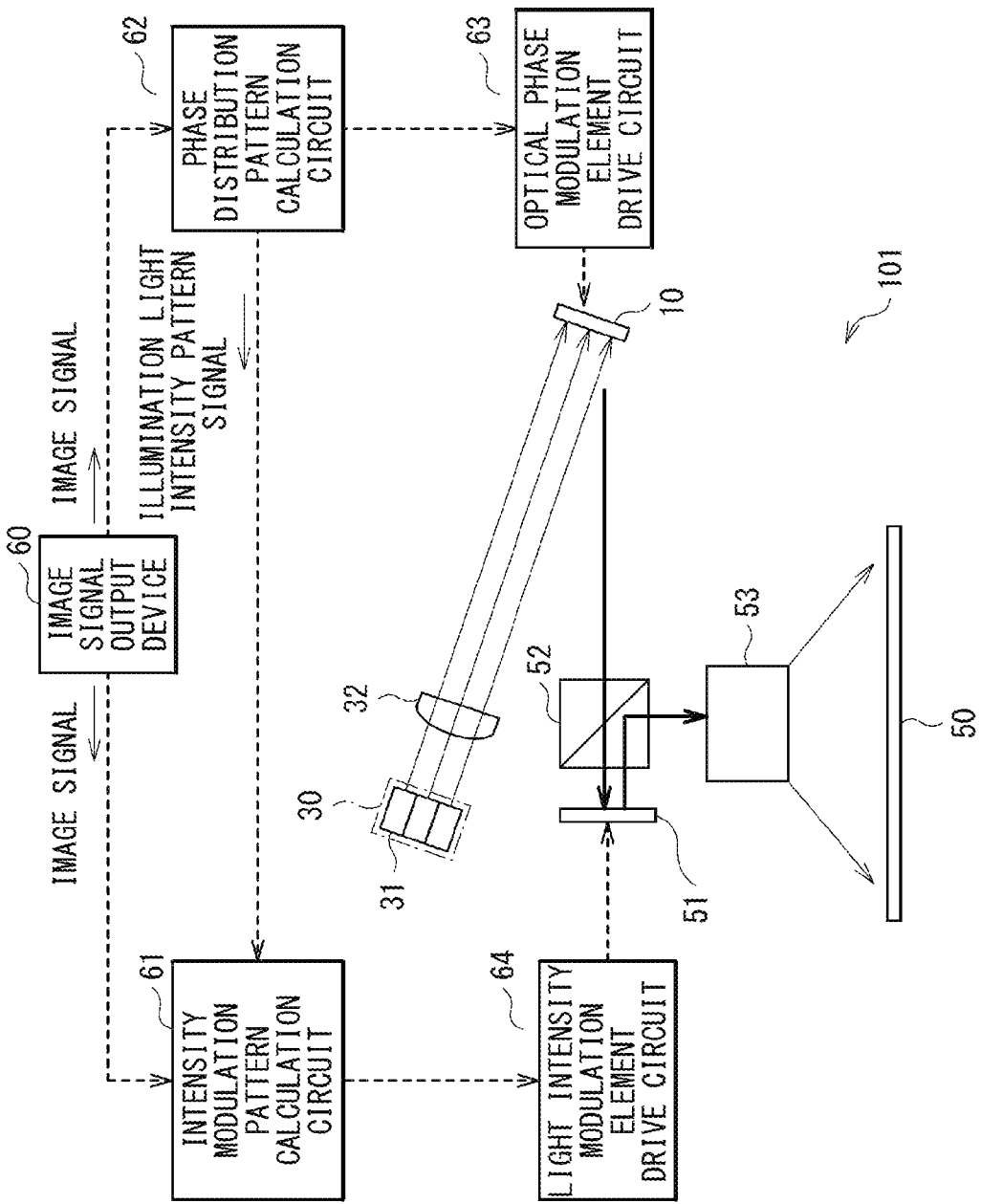
[FIG. 20]

[FIG. 21]
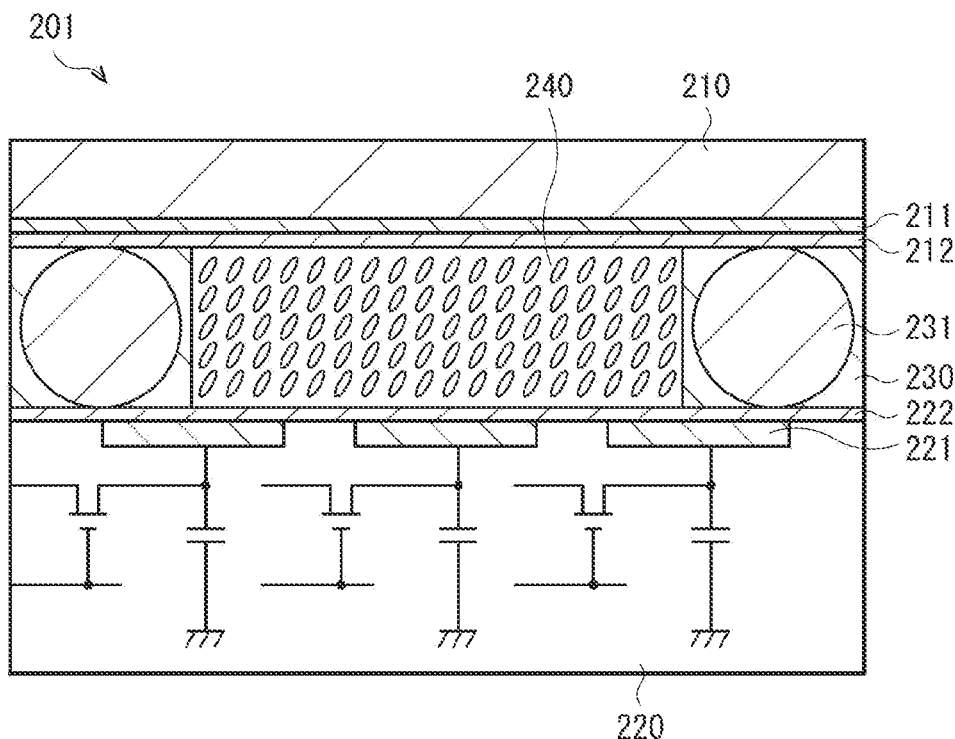
[FIG. 22]
|  |  | R | G | B |
|---|---|---|---|---|
|  | WAVELENGTH (nm) | 630 | 550 | 450 |
| Δn | MATERIAL A | 0.22 | 0.25 | 0.27 |
|  | MATERIAL B | 0.18 | 0.20 | 0.22 |
|  | MATERIAL C | 0.20 | 0.22 | 0.24 |

[FIG. 23]
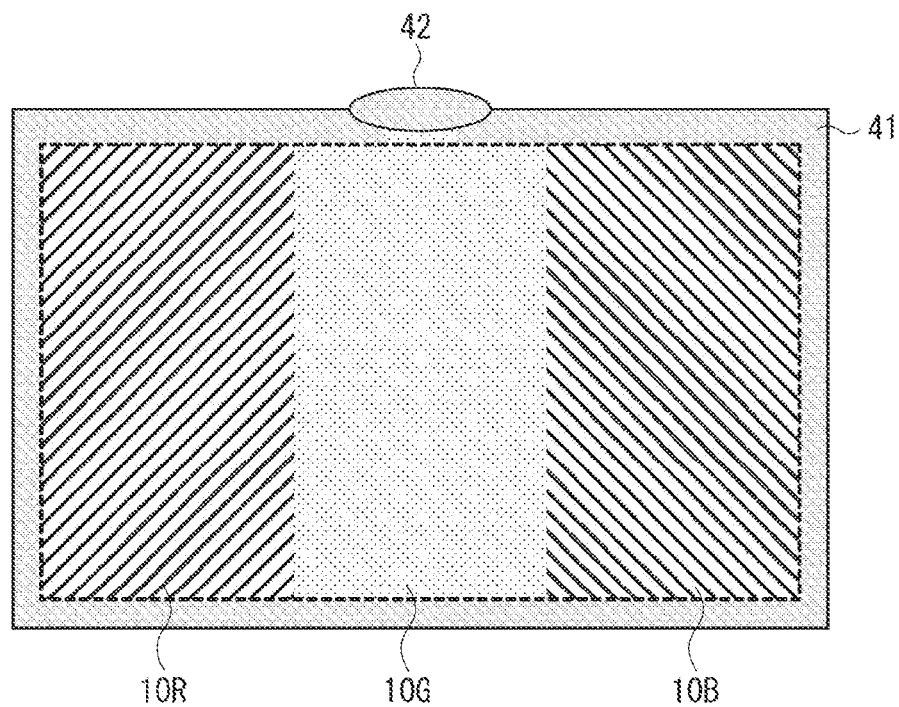

[FIG. 24]

| PANEL DESIGN | | COMPARATIVE EXAMPLE | | | EXAMPLE 1 | | |
|---|---|---|---|---|---|---|---|
| | | R REGION | G REGION | B REGION | R REGION | G REGION | B REGION |
| | GAP d (μm) | 1.8 | → | → | 1.8 | → | → |
| LIQUID CRYSTAL MATERIAL | TYPE | MATERIAL A | → | → | MATERIAL A | → | MATERIAL B |
| | Δn (WAVELENGTH) | 0.22 (630nm) | 0.25 (550nm) | 0.27 (450nm) | 0.22 (630nm) | 0.25 (550nm) | 0.22 (450nm) |

[FIG. 25]
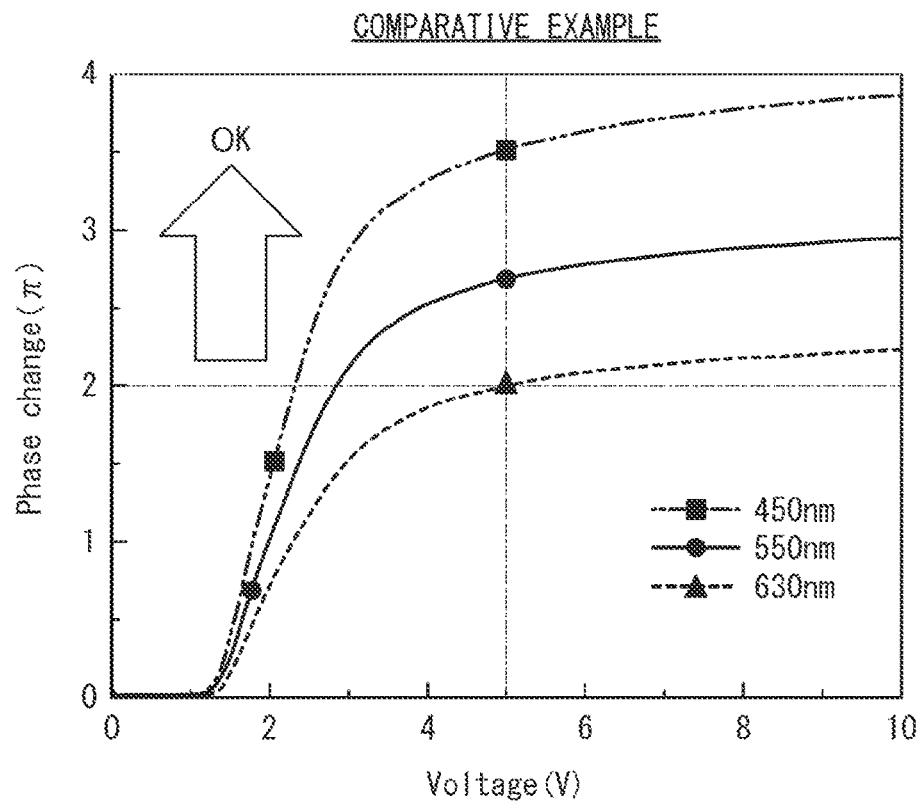
[FIG. 26]
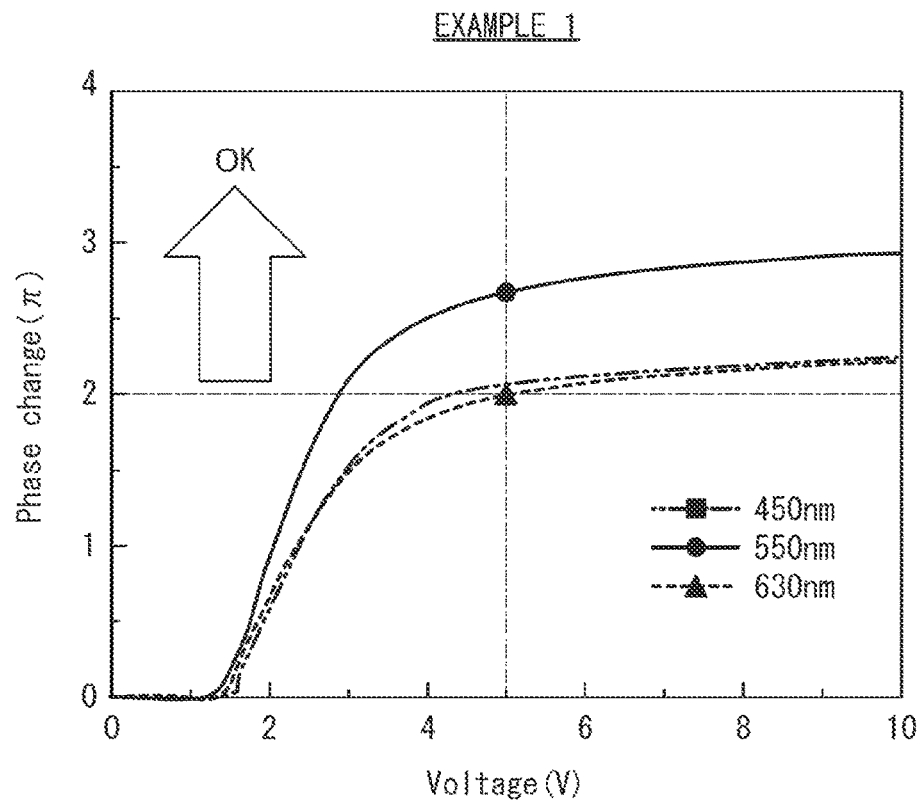

[FIG. 27]

| | | COMPARATIVE EXAMPLE | | | EXAMPLE 1 | | |
|---|---|---|---|---|---|---|---|
| | | R REGION | G REGION | B REGION | R REGION | G REGION | B REGION |
| VOLTAGE NECESSARY FOR $2\pi$ MODULATION | | 5.0V | 2.8V | 2.0V | 5.0V | 2.8V | 5.0V |
| LIQUID CRYSTAL MATERIAL | TYPE | MATERIAL A | ← | ← | MATERIAL A | ← | MATERIAL B |
| | $\Delta n$ (WAVELENGTH) | 0.22 (630nm) | 0.25 (550nm) | 0.27 (450nm) | 0.22 (630nm) | 0.25 (550nm) | 0.22 (450nm) |

[FIG. 28]
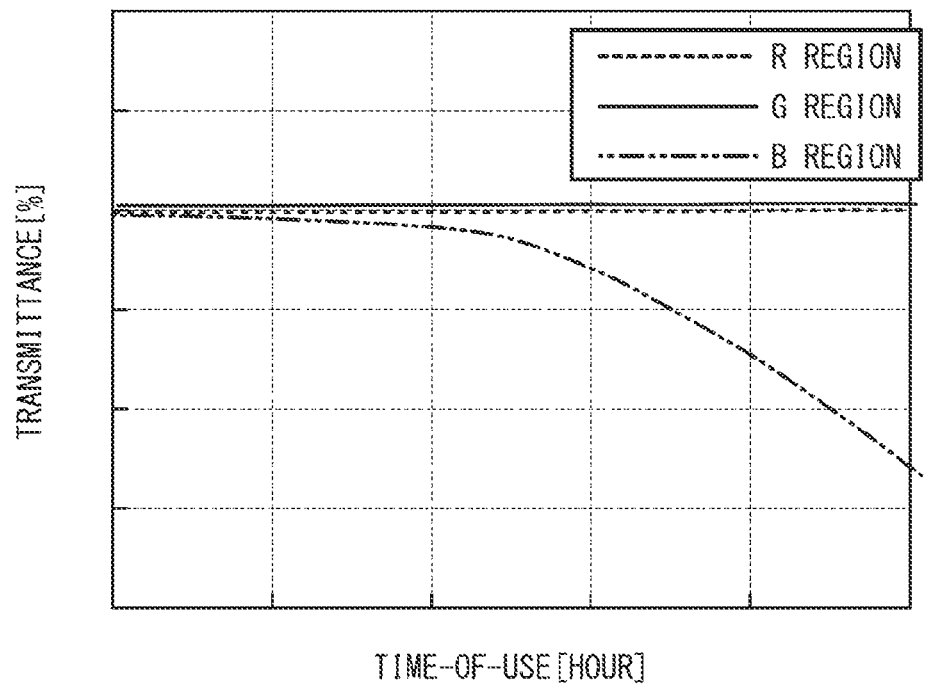
[FIG. 29]
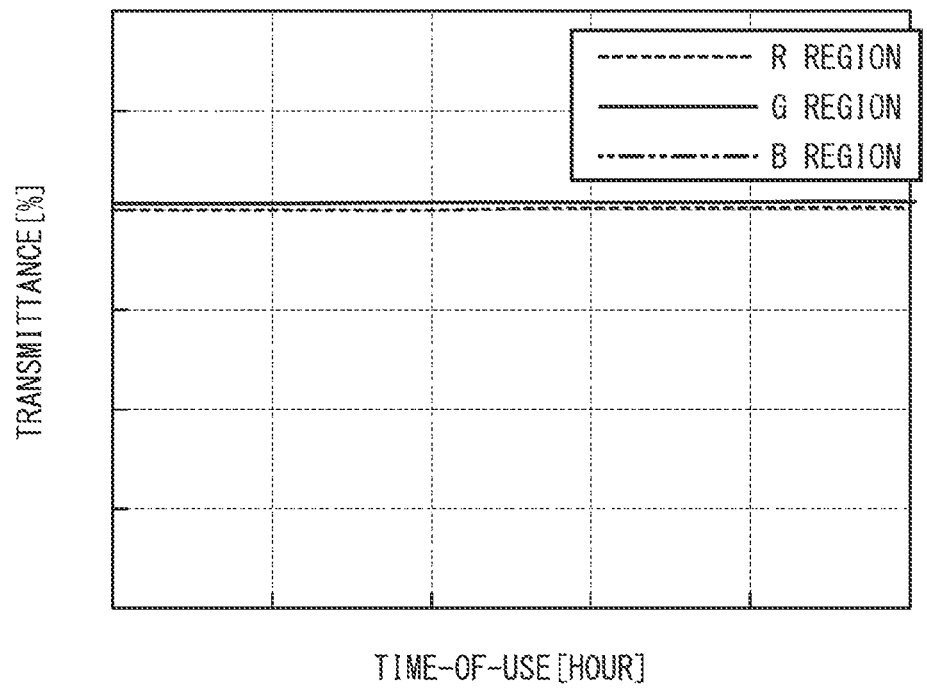

[FIG. 30]

| ELAPSED TIME | 0h | 100h | 250h | 500h |
|---|---|---|---|---|
| COMPARATIVE EXAMPLE | OK | OK | NG | NG |
| EXAMPLE 1 | OK | OK | OK | OK |

[FIG. 31]

| PANEL DESIGN | | COMPARATIVE EXAMPLE | | | EXAMPLE 2 | | |
|---|---|---|---|---|---|---|---|
| | | R REGION | G REGION | B REGION | R REGION | G REGION | B REGION |
| | GAP d (μm) | 1.8 | ← | ← | 1.8 | ← | ← |
| LIQUID CRYSTAL MATERIAL | TYPE | MATERIAL A | ← | ← | MATERIAL A | MATERIAL C | MATERIAL B |
| | Δn (WAVELENGTH) | 0.22 (630nm) | 0.25 (550nm) | 0.27 (450nm) | 0.22 (630nm) | 0.22 (550nm) | 0.22 (450nm) |

[FIG. 32]
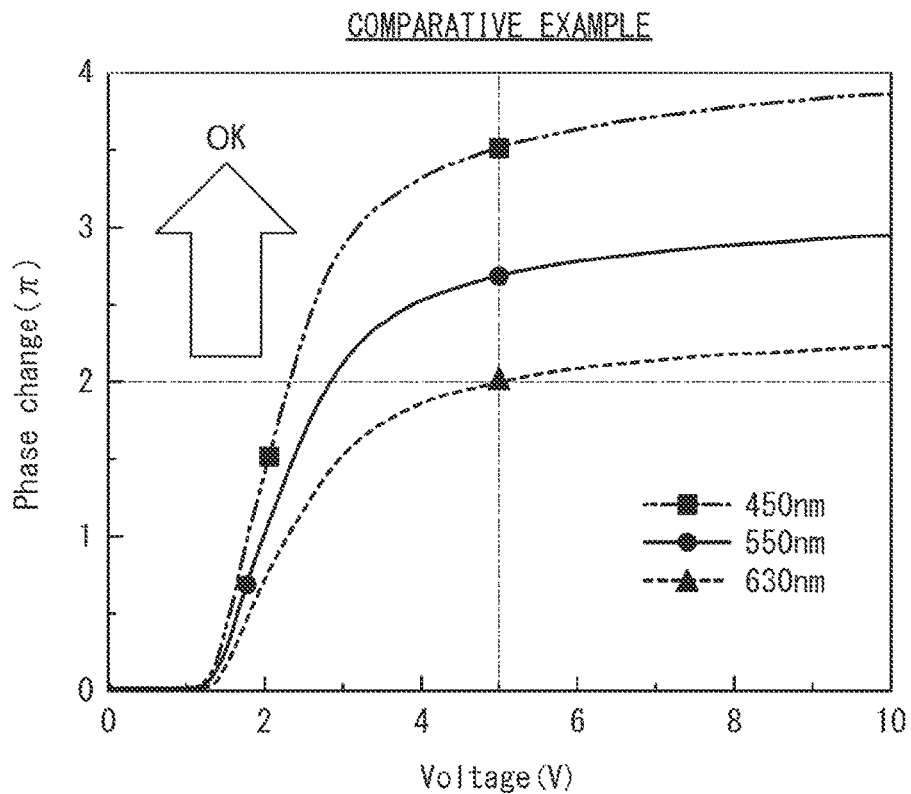
[FIG. 33]
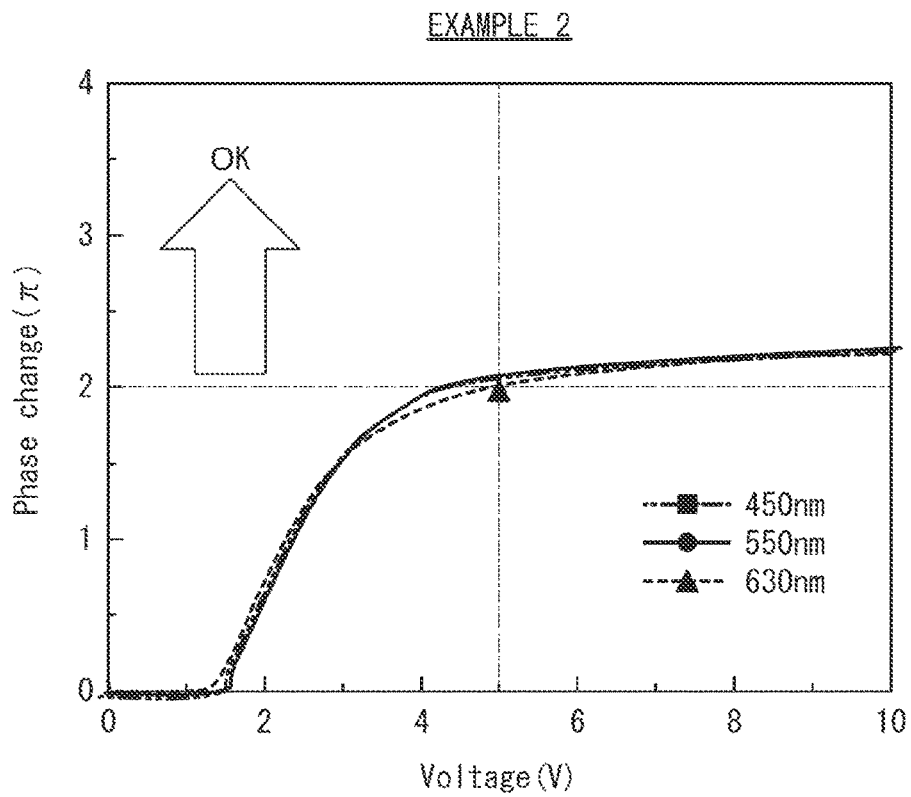

[FIG. 34]

| | | | COMPARATIVE EXAMPLE | | | EXAMPLE 2 | | |
|---|---|---|---|---|---|---|---|---|
| | | | R REGION | G REGION | B REGION | R REGION | G REGION | B REGION |
| VOLTAGE NECESSARY FOR 2π MODULATION | | | 5.0V | 2.8V | 2.0V | 5.0V | 5.0V | 5.0V |
| LIQUID CRYSTAL MATERIAL | TYPE | | MATERIAL A | ← | ← | MATERIAL A | MATERIAL C | MATERIAL B |
| | Δn (WAVELENGTH) | | 0.22 (630nm) | 0.25 (550nm) | 0.27 (450nm) | 0.22 (630nm) | 0.22 (550nm) | 0.22 (450nm) |

[FIG. 35]
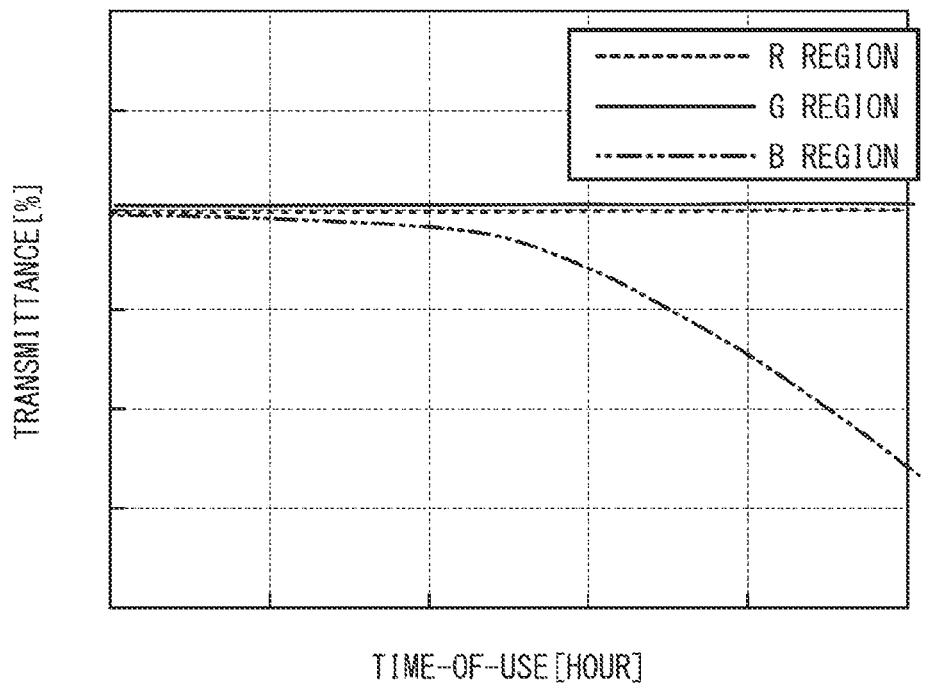
[FIG. 36]
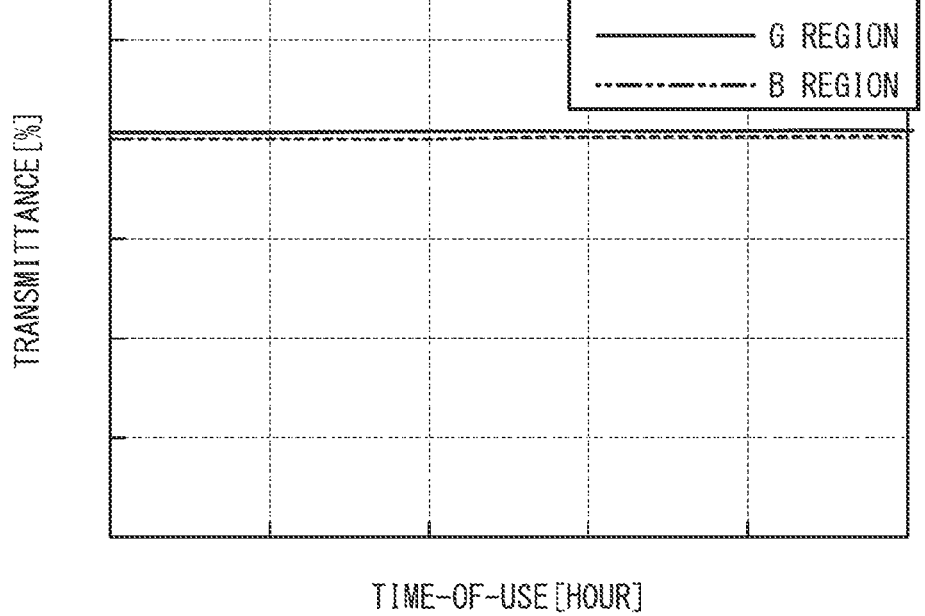

[FIG. 37]

| PANEL DESIGN | | COMPARATIVE EXAMPLE | | | EXAMPLE 3 | | |
|---|---|---|---|---|---|---|---|
| | | R REGION | G REGION | B REGION | R REGION | G REGION | B REGION |
| PANEL DESIGN | GAP d (μm) | 1.8 | ← | ← | 1.8 | ← | ← |
| LIQUID CRYSTAL MATERIAL | TYPE | MATERIAL A | ← | ← | MATERIAL A | ← | MATERIAL B |
| | Δn (WAVELENGTH) | 0.22 (630nm) | 0.25 (550nm) | 0.27 (450nm) | 0.22 (630nm) | 0.25 (550nm) | 0.22 (450nm) |

[FIG. 38]
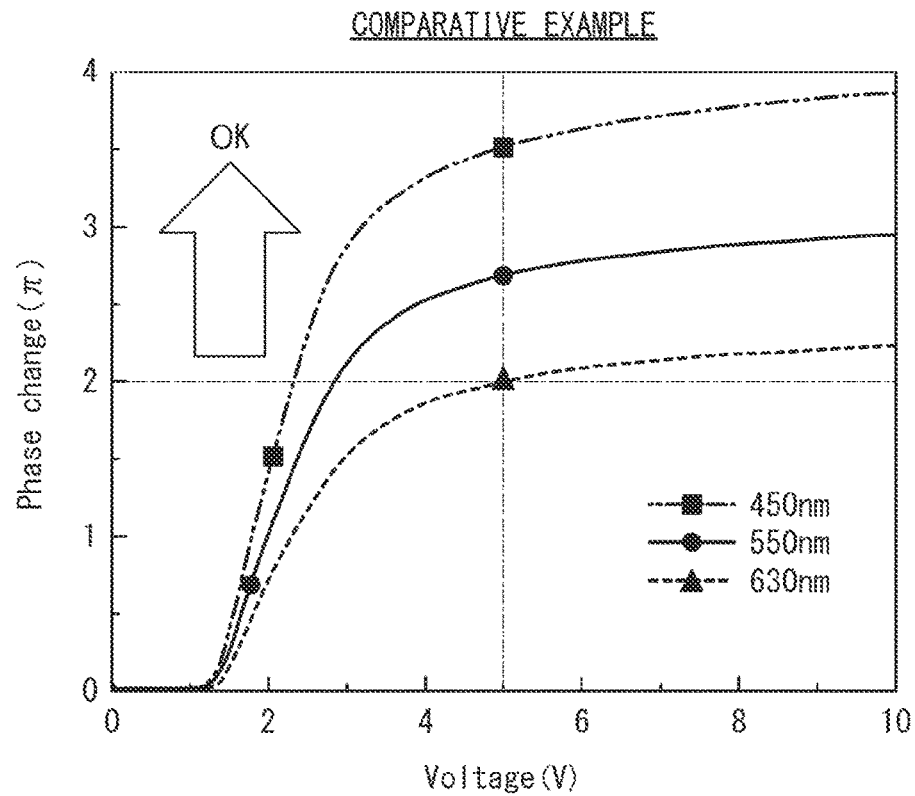
[FIG. 39]
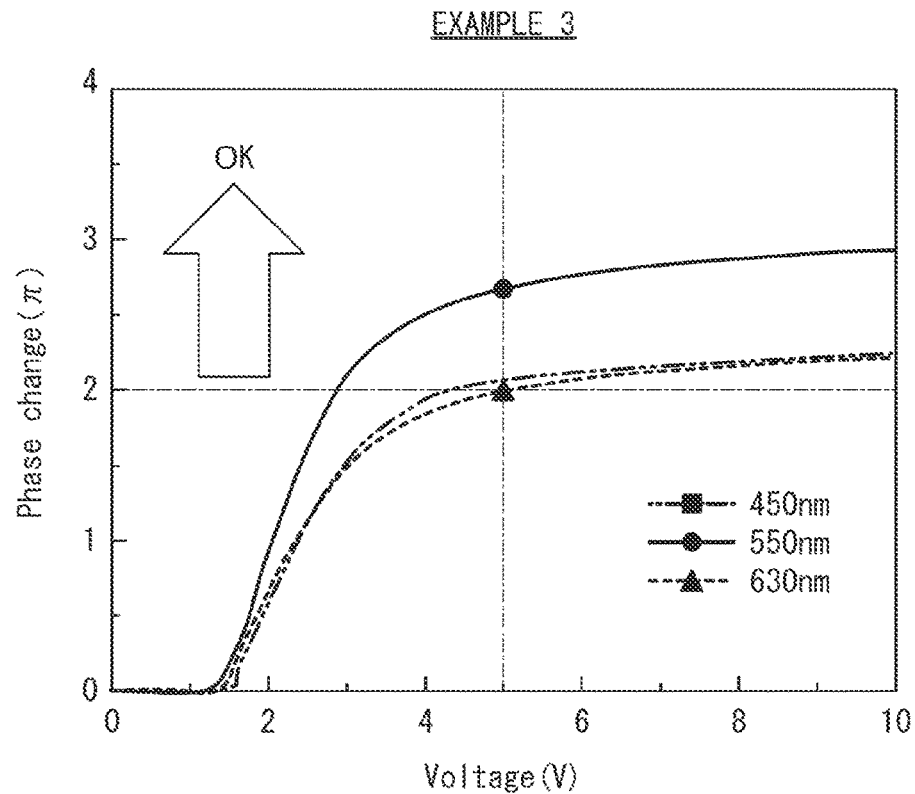

[FIG. 40]

| | COMPARATIVE EXAMPLE | | | EXAMPLE 3 | | |
|---|---|---|---|---|---|---|
| | R REGION | G REGION | B REGION | R REGION | G REGION | B REGION |
| VOLTAGE NECESSARY FOR 2π MODULATION | 5.0V | 2.8V | 2.0V | 5.0V | 2.8V | 5.0V |
| LIQUID CRYSTAL MATERIAL — TYPE | MATERIAL A | ← | ← | MATERIAL A | ← | MATERIAL B |
| LIQUID CRYSTAL MATERIAL — Δn (WAVELENGTH) | 0.22 (630nm) | 0.25 (550nm) | 0.27 (450nm) | 0.22 (630nm) | 0.25 (550nm) | 0.22 (450nm) |

[FIG. 41]
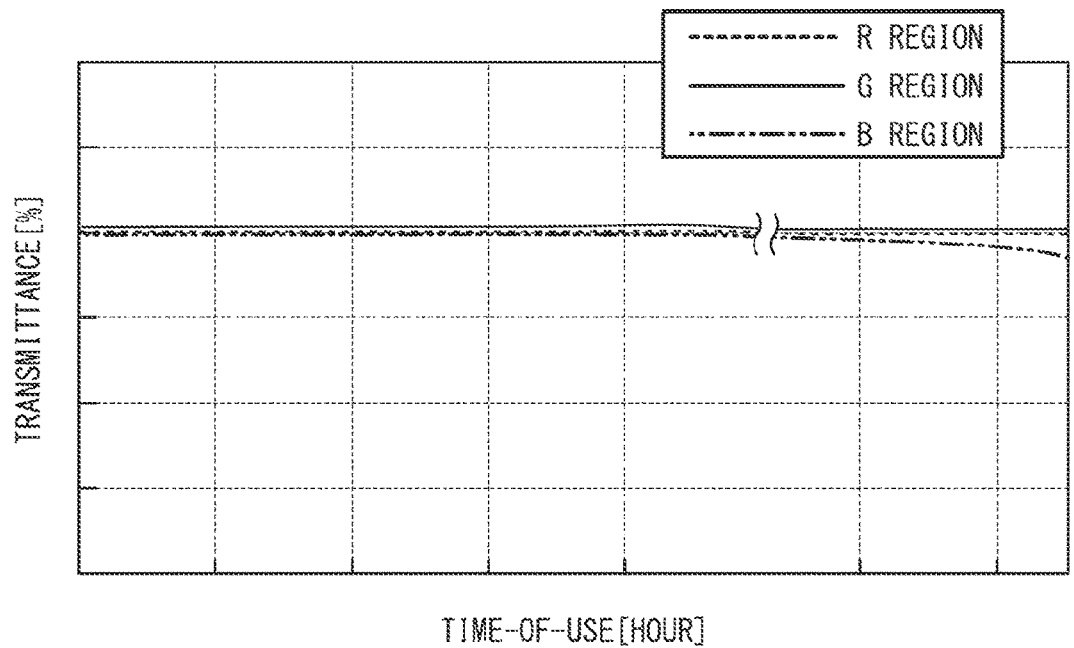

[FIG. 42]

| | TEMPORAL CHANGE IN REPRODUCED IMAGE | | | | |
|---|---|---|---|---|---|
| | INITIAL STAGE | 250 HOURS LATER | 500 HOURS LATER | 750 HOURS LATER | 1000 HOURS LATER |
| COMPARATIVE EXAMPLE | 5 | 3 | | | |
| EXAMPLE 1 | 5 | 5 | 5 | 3 | |
| EXAMPLE 3 | 5 | 5 | 5 | 5 | 3 |

5: FAVORABLE REPRODUCED IMAGE (INITIAL IMAGE)
3: SOME PEOPLE NOTICE ROUGHNESS OF REPRODUCED IMAGE (NG)
1: MOST PEOPLE NOTICE ROUGHNESS OF REPRODUCED IMAGE

[FIG. 43]

|  |  | EXAMPLE 4 | | |
|---|---|---|---|---|
|  |  | R REGION | G REGION | B REGION |
| PANEL DESIGN | ALIGNMENT FILM | POLYIMIDE | ← | INORGANIC ALIGNMENT FILM |
|  | GAP d ($\mu$m) | 1.8 | ← | ← |
| LIQUID CRYSTAL MATERIAL | TYPE | MATERIAL a POSITIVE | ← | MATERIAL B NEGATIVE |
|  | $\Delta$n (WAVELENGTH) | 0.22 (630nm) | 0.25 (550nm) | 0.22 (450nm) |

[FIG. 44]
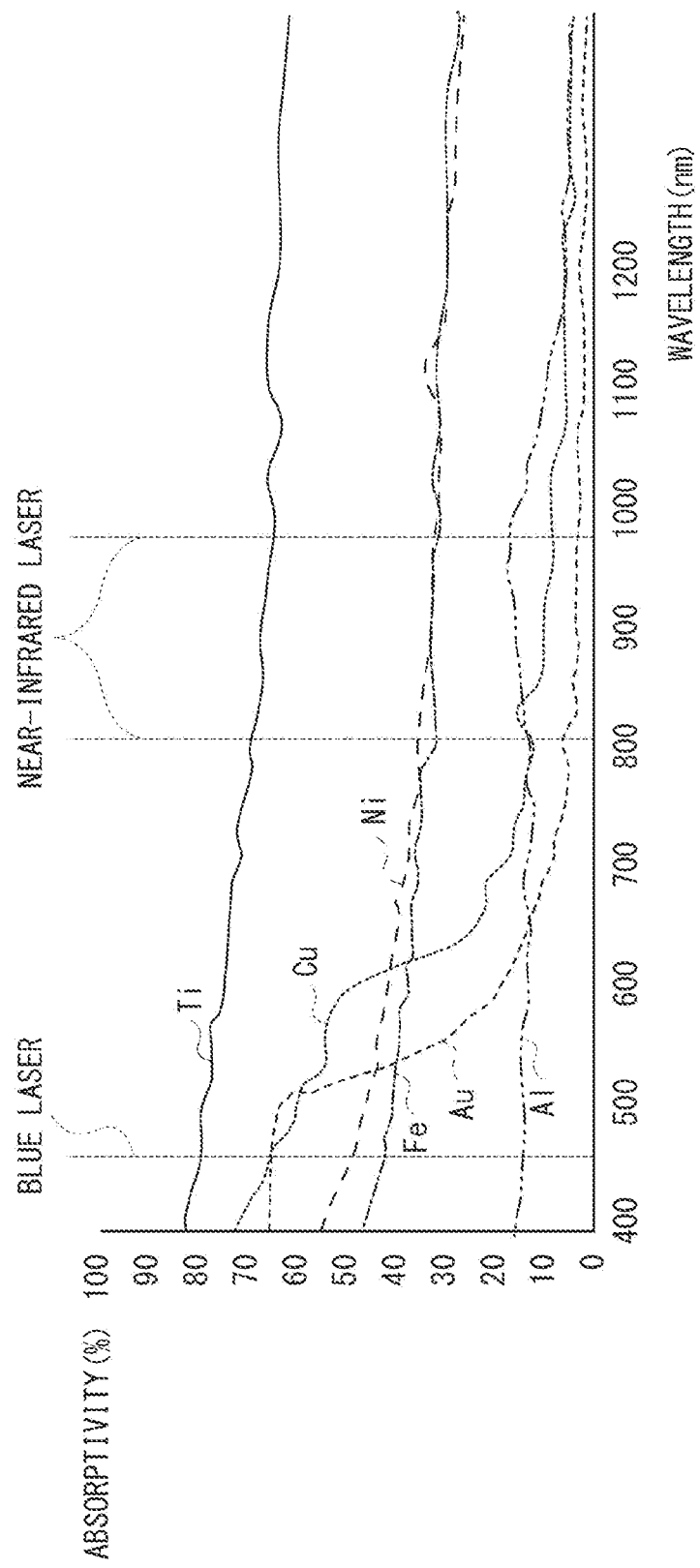

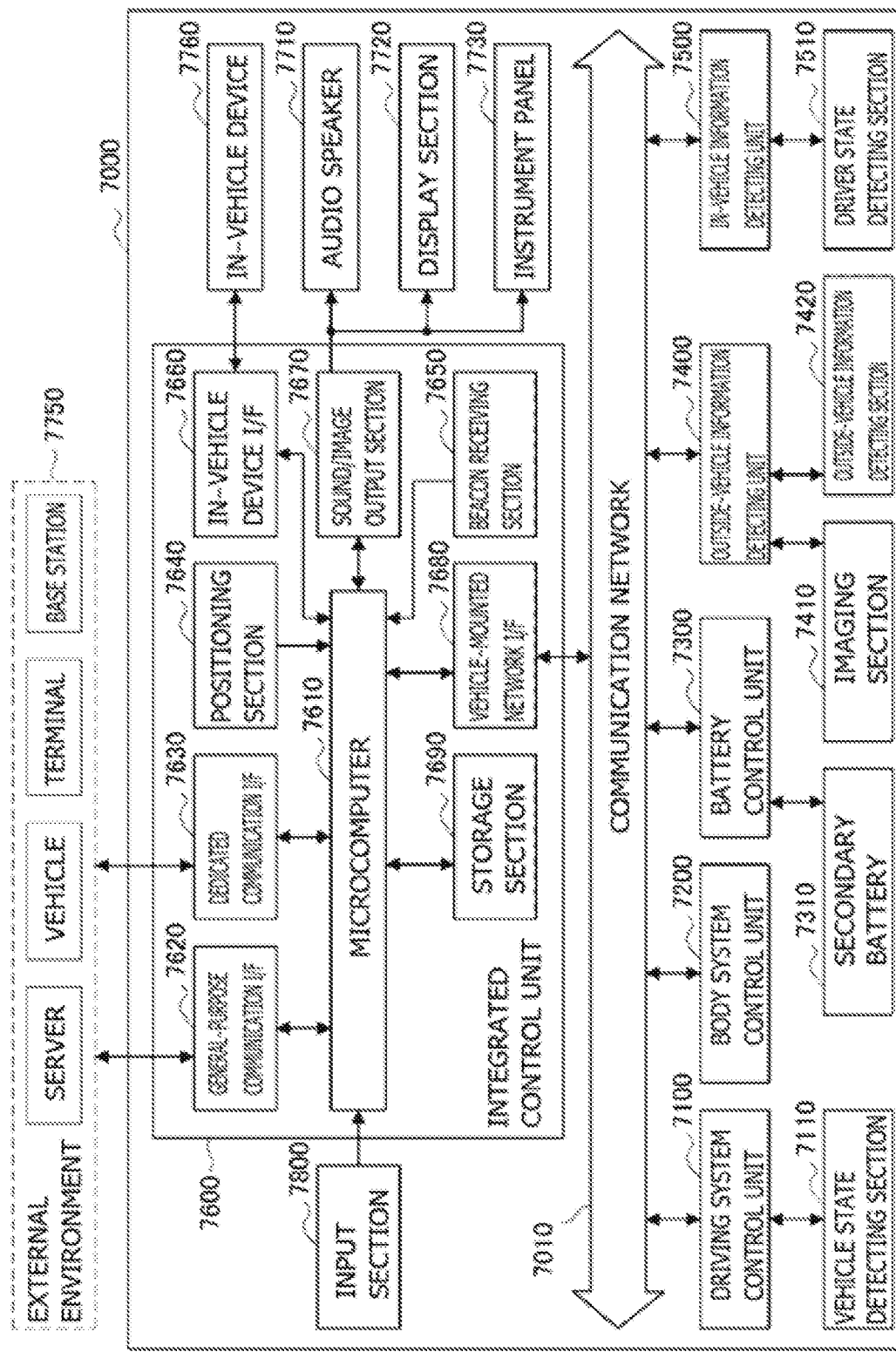
[FIG. 45]

[FIG. 46]
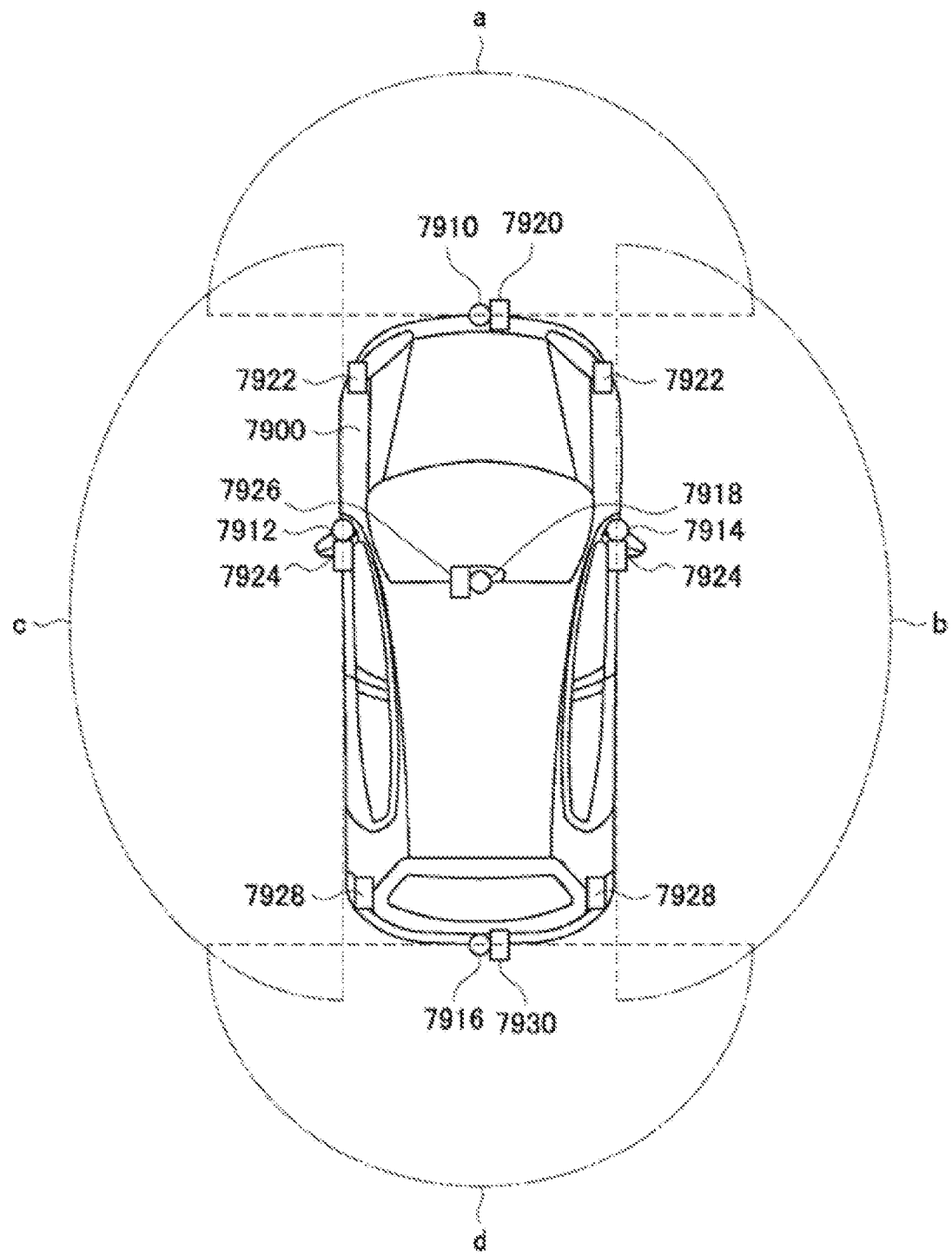

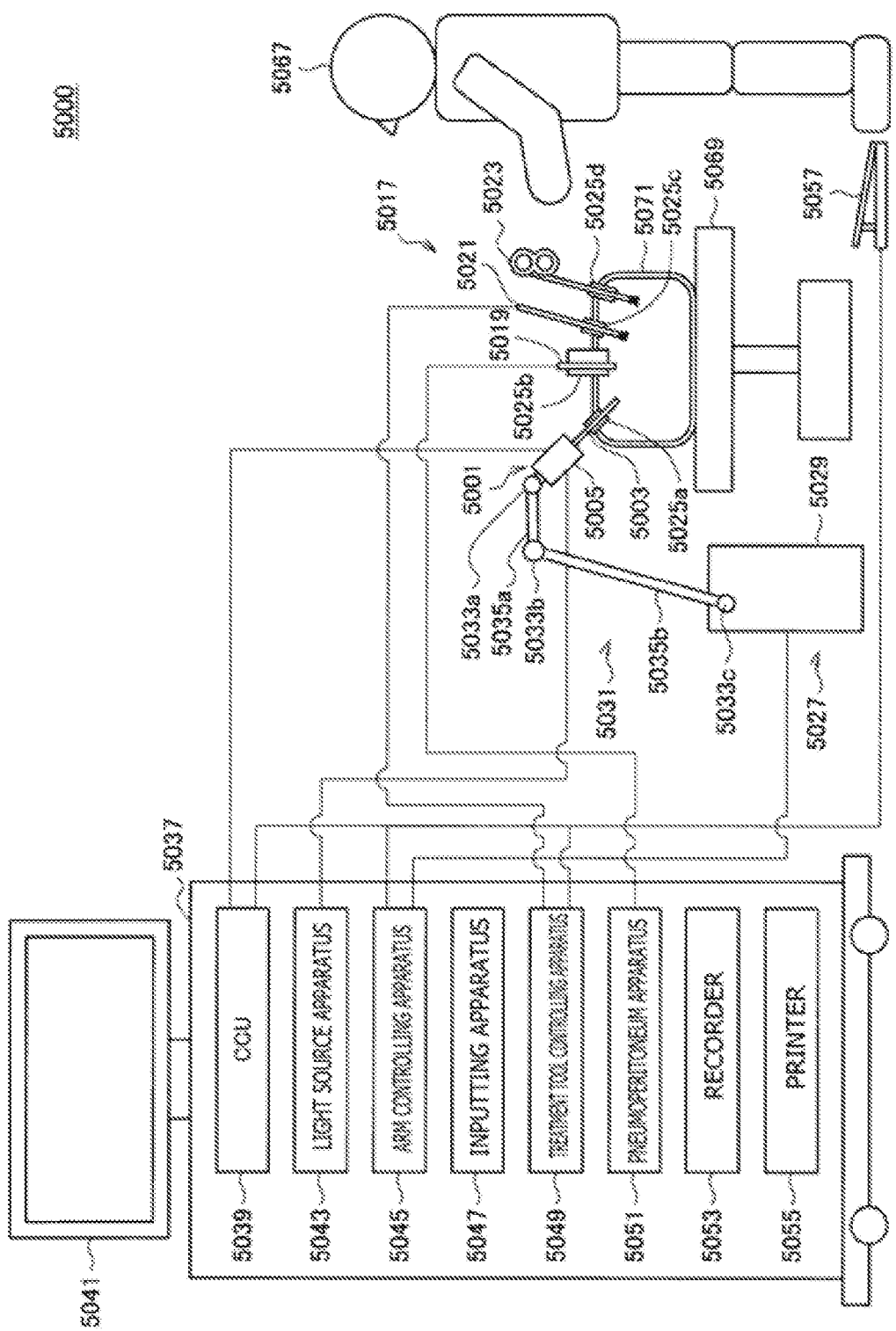
[FIG. 47]

[FIG. 48]
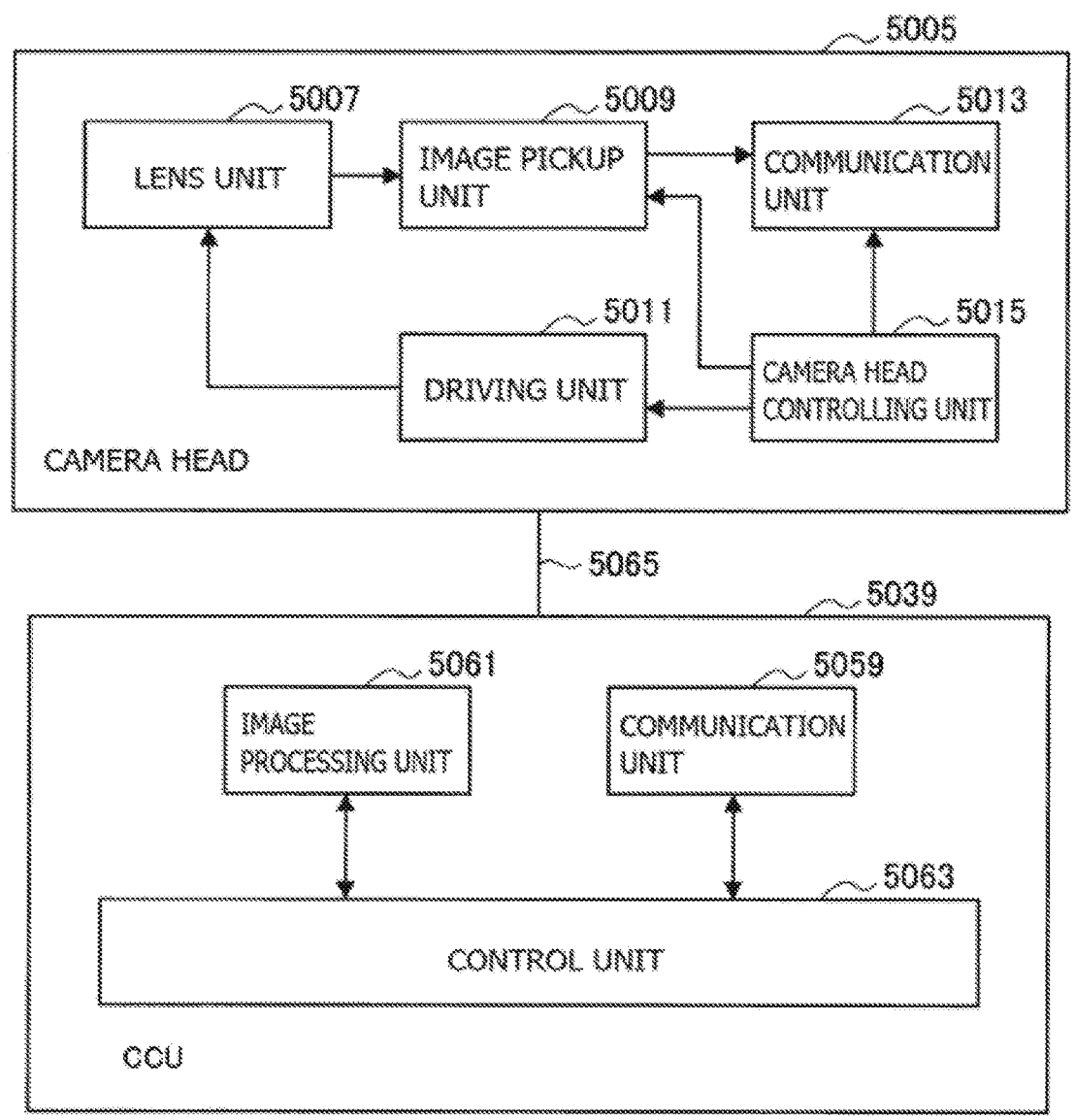

OPTICAL PHASE MODULATION ELEMENT AND DISPLAY APPARATUS

CROSS REFERENCE TO RELATED APPLICATIONS

This application is a U.S. National Phase of International Patent Application No. PCT/JP2021/029845 filed on Aug. 13, 2021, which claims priority benefit of Japanese Patent Application No. JP 2020-147720 filed in the Japan Patent Office on Sep. 2, 2020. Each of the above-referenced applications is hereby incorporated herein by reference in its entirety.

TECHNICAL FIELD

The present disclosure relates to an optical phase modulation element and a display apparatus using a liquid crystal material.

BACKGROUND ART

There has been known a display apparatus that causes a light intensity modulation element to modulate light luminance (intensity) to display a picture. In addition, there has been known an optical phase modulation element that modulates a phase of light to generate a desired reproduced image. The light intensity modulation element and the optical phase modulation element are each configured by, for example, a liquid crystal panel. Practical application examples of the optical phase modulation element include techniques that generate a reproduced image of which a phase is modulated in accordance with an image to be displayed to utilize the reproduced image as illumination light toward the light intensity modulation element for picture display (see PTLs 1 to 3). In particular, PTL 3 proposes a technique of using one optical phase modulation element to generate illumination light of three primary colors necessary for color display.

CITATION LIST

Patent Literature

PTL 1: Japanese Unexamined Patent Application Publication No. 2008-292725
PTL 2: Japanese Unexamined Patent Application Publication No. 2008-89686
PTL 3: Japanese Unexamined Patent Application Publication No. H4-293075

SUMMARY OF THE INVENTION

In a case of performing phase modulation on a plurality of color light beams by using one optical phase modulation element in which a single liquid crystal material is encapsulated, phase modulation characteristics, light resistance, and the like differ depending on wavelengths due to the nature of liquid crystal materials, thus leading to a decrease in performance and reliability.

It is desirable to provide an optical phase modulation element and a display apparatus that make it possible to achieve high performance and high reliability.

An optical phase modulation element according to an embodiment of the present disclosure includes a plurality of divided regions provided in different regions in an in-plane direction and encapsulating a liquid crystal material having a different refractive index anisotropy, in which the plurality of divided regions each displays a phase distribution pattern for a color having a different wavelength.

A display apparatus according to an embodiment of the present disclosure includes: a light source unit that emits a plurality of color light beams having different wavelengths; and an optical phase modulation element that performs phase modulation on each of the plurality of color light beams from the light source unit, in which the optical phase modulation element includes a plurality of divided regions provided in different regions in an in-plane direction and encapsulating a liquid crystal material having a different refractive index anisotropy, the plurality of divided regions each displaying a phase distribution pattern for a color having a different wavelength.

In the optical phase modulation element or the display apparatus according to the embodiment of the present technology, a liquid crystal material having a different refractive index anisotropy is encapsulated in each of the plurality of divided regions, and each of the divided regions displays a phase distribution pattern for a color having a different wavelength.

BRIEF DESCRIPTION OF THE DRAWINGS

FIG. 1 is a perspective view of an overview of a display apparatus of a luminance modulation scheme.
FIG. 2 is a cross-sectional view of the overview of the display apparatus of the luminance modulation scheme.
FIG. 3 is a perspective view of an overview of a display apparatus of a phase modulation scheme.
FIG. 4 is a cross-sectional view of the overview of the display apparatus of the phase modulation scheme.
FIG. 5 is an explanatory diagram illustrating an overview of an index ellipsoid.
FIG. 6 is an explanatory diagram illustrating an example of a macroscopic refractive index distribution of a liquid crystal material.
FIGS. 7A and 7B FIGS. 7A and 7B are cross-sectional views of an overview of a liquid crystal panel in a VA mode.
FIG. 8 is a front view illustrating an overview of a liquid crystal panel of the luminance modulation scheme.
FIG. 9 is a cross-sectional view of the overview of the liquid crystal panel of the luminance modulation scheme.
FIG. 10 is a front view of an overview of a liquid crystal panel of a phase modulation scheme.
FIG. 11 is a cross-sectional view of the overview of the liquid crystal panel of the phase modulation scheme.
FIG. 12 is an explanatory diagram illustrating an overview of a single-panel type color optical phase modulation element according to a comparative example.
FIG. 13 is an explanatory diagram illustrating an example of wavelength dispersion characteristics of a refractive index anisotropy of a typical liquid crystal material.
FIG. 14 is an explanatory diagram illustrating an example of a relative luminous efficiency curve.
FIG. 15 is a plan view schematically illustrating a first example of an in-plane structure of an optical phase modulation element according to a first embodiment of the present disclosure.
FIG. 16 is a plan view schematically illustrating a second example of the in-plane structure of the optical phase modulation element according to the first embodiment.
FIG. 17 is a plan view schematically illustrating a third example of the in-plane structure of the optical phase modulation element according to the first embodiment.

FIG. 18 is a plan view schematically illustrating a first modification example of the in-plane structure of the optical phase modulation element according to the first embodiment.

FIG. 19 is a plan view schematically illustrating a second modification example of the in-plane structure of the optical phase modulation element according to the first embodiment.

FIG. 20 is a configuration diagram schematically illustrating a configuration example of a display apparatus using the optical phase modulation element according to the first embodiment.

FIG. 21 is a cross-sectional view schematically illustrating a configuration example of the optical phase modulation element according to the first embodiment.

FIG. 22 is an explanatory diagram illustrating types of liquid crystal materials used in optical phase modulation elements according to respective Examples.

FIG. 23 is a plan view of an overview of an optical phase modulation element according to the comparative example.

FIG. 24 is an explanatory diagram illustrating values of a cell gap d of each of optical phase modulation elements according to the comparative example and Example 1 as well as the types and physical property values of liquid crystal materials.

FIG. 25 is an explanatory diagram illustrating voltage characteristics of a phase modulation amount of the optical phase modulation element according to the comparative example.

FIG. 26 is an explanatory diagram illustrating voltage characteristics of a phase modulation amount of the optical phase modulation element according to Example 1.

FIG. 27 is an explanatory diagram illustrating voltage values necessary for $2\pi$ modulation of a phase in the optical phase modulation elements according to the comparative example and Example 1.

FIG. 28 is an explanatory diagram illustrating results of a light resistance test in the optical phase modulation element according to the comparative example.

FIG. 29 is an explanatory diagram illustrating results of a light resistance test in the optical phase modulation element according to Example 1.

FIG. 30 is an explanatory diagram illustrating results of a reliability test in the optical phase modulation elements according to the comparative example and Example 1.

FIG. 31 is an explanatory diagram illustrating values of the cell gap d of each of optical phase modulation elements according to the comparative example and Example 2 as well as the types and physical property values of liquid crystal materials.

FIG. 32 is an explanatory diagram illustrating the voltage characteristics of the phase modulation amount of the optical phase modulation element according to the comparative example.

FIG. 33 is an explanatory diagram illustrating voltage characteristics of a phase modulation amount of the optical phase modulation element according to Example 2.

FIG. 34 is an explanatory diagram illustrating voltage values necessary for $2\pi$ modulation of a phase in the optical phase modulation elements according to the comparative example and Example 2.

FIG. 35 is an explanatory diagram illustrating results of the light resistance test in the optical phase modulation element according to the comparative example.

FIG. 36 is an explanatory diagram illustrating results of a light resistance test in the optical phase modulation element according to Example 2.

FIG. 37 is an explanatory diagram illustrating values of the cell gap d of each of optical phase modulation elements according to the comparative example and Example 3 as well as the types and physical property values of liquid crystal materials.

FIG. 38 is an explanatory diagram illustrating the voltage characteristics of the phase modulation amount of the optical phase modulation element according to the comparative example.

FIG. 39 is an explanatory diagram illustrating voltage characteristics of a phase modulation amount of the optical phase modulation element according to Example 3.

FIG. 40 is an explanatory diagram illustrating voltage values necessary for $2\pi$ modulation of a phase in the optical phase modulation elements according to the comparative example and Example 3.

FIG. 41 is an explanatory diagram illustrating results of a light resistance test in the optical phase modulation element according to Example 3.

FIG. 42 is an explanatory diagram illustrating evaluation results of reproduced images in each of the optical phase modulation elements according to the comparative example, Example 1, and Example 3.

FIG. 43 is an explanatory diagram illustrating types of alignment films and values of the cell gap d of an optical phase modulation element according to Example 4 as well as the types and physical property values of liquid crystal materials.

FIG. 44 is an explanatory diagram illustrating wavelength characteristics of light absorptivity in metals.

FIG. 45 is a block diagram depicting an example of schematic configuration of a vehicle control system.

FIG. 46 is a diagram of assistance in explaining an example of installation positions of an outside-vehicle information detecting section and an imaging section.

FIG. 47 is a view depicting an example of a schematic configuration of an endoscopic surgery system.

FIG. 48 is a block diagram depicting an example of a functional configuration of a camera head and a camera control unit (CCU) depicted in FIG. 47.

MODES FOR CARRYING OUT THE INVENTION

Hereinafter, description is given in detail of embodiments of the present disclosure with reference to the drawings. It is to be noted that the description is given in the following order.
0. Comparative Example (FIGS. 1, 2, 3, 4, 5, 6, 7A, 7B, 8, 9, 10, 11, 12, 13, and 14)
1. First Embodiment
   1.1 Overview (Planar Configuration Example of Optical Phase Modulation Element) (FIGS. 15 to 19)
   1.2 Configuration Example of Display Apparatus (FIG. 20)
   1.3 Cross-Sectional Configuration Example of Optical Phase Modulation Element (FIG. 21)
   1.4 Examples (FIGS. 22 to 43)
   1.5 Modification Example (FIG. 44)
2. Practical Application Examples (FIGS. 45 to 48)
   2.1 First Practical Application Example
   2.2 Second Practical Application Example
3. Other embodiments 0. Comparative Example FIGS. 1 and 2 each illustrate an overview of a display apparatus of a luminance modulation scheme.

Examples of a configuration of a typical projection-type display apparatus (projector) include, as illustrated in FIGS. 1 and 2, a configuration in which a light intensity modulation element 501 is irradiated with uniform illumination light emitted from a light source 500 to perform light intensity modulation for generation of an image, and the generated image is projected onto a screen 50 through a projection lens.

As the light intensity modulation element 501, an LCD (Liquid Crystal Display: liquid crystal panel) or a DMD (Digital Micro-mirror Device (mirror device) is typically used. In particular, a liquid crystal projector using a liquid crystal panel has favorable color reproducibility, thus making it possible to achieve high image quality. In the liquid crystal projector, a liquid crystal panel is used as an optical shutter. FIGS. 1 and 2 each illustrate an example of using a transmissive liquid crystal panel as the light intensity modulation element 501. The liquid crystal panel has a configuration in which a liquid crystal layer 513 including a plurality of liquid crystal molecules 514 is interposed between a pair of substrates 502 and 503. In a case where the light intensity modulation element 501 is a transmissive liquid crystal panel, a polarizer 521 is disposed in a light incidence direction, and an analyzer 522 is disposed in a light output direction. The polarizer 521 outputs polarized light, of incident light L11, polarized in a predetermined polarization direction. In a case of the display apparatus of the luminance modulation scheme, one pixel of the light intensity modulation element 501 corresponds to one pixel of a finally displayed image. In a case where the light intensity modulation element 501 is a liquid crystal panel, displaying a dark picture region requires blocking of illumination light by the liquid crystal panel, which decreases light utilization efficiency remarkably due to presence of light not used for the display.

Meanwhile, there is disclosed, as a display apparatus of a phase modulation scheme, a technique in which an SLM (Spatial Light Modulator: spatial optical phase modulation element) is utilized as a diffractive element to generate illumination light, thereby distributing, to a high-luminance region, a portion of light with which a low-luminance pixel region is irradiated (see, e.g., PTLs 1 and 2). It may also be possible to use a liquid crystal panel as the optical phase modulation element.

FIGS. 3 and 4 each illustrate an overview of the display apparatus of the phase modulation scheme.

FIGS. 3 and 4 each illustrate an example of using a reflective diffractive element as an optical phase modulation element 1. For example, in the display apparatus of the phase modulation scheme irradiates, the optical phase modulation element 1 is irradiated with uniform illumination light emitted from the light source 500 for performing phase modulation to thereby generate a reproduced image, which is projected onto the screen 50. The display apparatus of the phase modulation scheme is highly efficient because light diffraction is used. In a case of the display apparatus of the phase modulation scheme, one pixel of the optical phase modulation element 1 does not necessarily correspond to one pixel of a finally displayed image; it may be possible for a plurality of pixels in the optical phase modulation element 1 to correspond to the one pixel of the displayed image. It is a feature of the optical phase modulation element 1 that, should a defective pixel be present, displayed pixels are stable, because it is possible to configure one pixel of a finally displayed image by using the plurality of pixels in the optical phase modulation element 1. In addition, color display is also possible; there is also disclosed a technique in which illumination light of three primary colors of R (red), G (green), and B (blue) is generated by using optical phase modulation elements 1 that differ for respective colors.

Description is given of light propagation in these luminance modulation scheme and phase modulation scheme by exemplifying a case of using a liquid crystal panel.

As illustrated in FIG. 5, a liquid crystal material to be used for the liquid crystal panel is a uniaxial index ellipsoid 530 having one optical axis. In FIG. 5, a z-axis denotes a long axis of the index ellipsoid 530, and an x-axis and a y-axis each denote a short axis of the index ellipsoid 530. The optical axis of the index ellipsoid 530 indicates a normal direction of a cut plane with the plane passing through the center of the ellipsoid being a circle, and corresponds to the z-axis in FIG. 5. In FIG. 5, when nx is a refractive index of the index ellipsoid 530 in the x-axis direction, ny is a refractive index thereof in the y-axis direction, and nz is a refractive index thereof in the z-axis direction, a relationship in the magnitude among the refractive indexes are: $nx=ny$ and $nx, ny<nz$.

FIG. 6 illustrates an example of a macroscopic refractive index distribution of a liquid crystal material.

An alignment direction of the liquid crystal molecules 514 is represented by a unit vector n called director (Director). From a macroscopic point of view, the average refractive index distribution of the plurality of liquid crystal molecules 514 may be considered as one index ellipsoid 530. Similarly to the index ellipsoid 530, the long axis and optical axis of the liquid crystal molecule 514 coincide with each other. The liquid crystal material has a refractive index anisotropy (=birefringence). The refractive index refers to a rate at which the traveling speed of a light wave traveling in a medium is decreased, and the birefringence refers to a phenomenon in which two refracted light beams appear when light enters a substance. Light vibrating parallel to the optical axis of the liquid crystal molecule 514 is called an extraordinary ray, and the refractive index for the extraordinary ray is expressed as ne. Light vibrating in a right-angle direction relative to the long axis of the liquid crystal molecule 514 is called an ordinary ray, and the refractive index for the ordinary ray is expressed as no. A difference between these refractive index ne and refractive index no is called a refractive index anisotropy $\Delta n$ ($=ne-no$). In a case where the refractive index anisotropy exists, a phase difference is generated in light depending on the incident direction.

Configuration Example of Liquid Crystal Panel

FIGS. 7A and 7B illustrate an overview of a liquid crystal panel in a VA (Vertical Alignment) mode.

In the example illustrated in FIGS. 7A and 7B, the liquid crystal material encapsulated in the liquid crystal panel is a negative liquid crystal, and the alignment is a perpendicular alignment. The liquid crystal panel in the VA mod is formed by filling a space between a pair of substrates 502 and 503 with the liquid crystal layer 513. A pixel electrode 512 to control the alignment of liquid layer molecules 514 configuring the liquid crystal layer 513 is patterned on a surface of one substrate 502 facing the liquid crystal layer 513. Similarly, a pixel electrode 511 to control the alignment of the liquid layer molecules 514 configuring the liquid crystal layer 513 is patterned on a surface of the other substrate 503 facing the liquid crystal layer 513. Although not illustrated, an alignment film is provided in such a state as to cover each of the pixel electrode 511 and the pixel electrode 512. FIG.

7A illustrates a state where a voltage between the pixel electrode 511 and the pixel electrode 512 is not applied (voltage OFF), and FIG. 7B illustrates a state where a voltage is applied between the pixel electrode 511 and the pixel electrode 512 (voltage ON). In the state where no voltage is applied, the liquid crystal molecules 514 stand. In the state where the voltage is applied, liquid crystal molecules 513 fall.

When a voltage is applied to the liquid crystal layer 513 by the pixel electrode 511 and the pixel electrode 512, the alignment is controlled by aligning the falling directions of the liquid crystal molecules 514 configuring the liquid crystal layer 513 across the entire surfaces of the pair of substrates 502 and 503. For this reason, the liquid crystal molecule 514 is provided with a uniform pretilt angle when no voltage is applied. For example, in the liquid crystal panel in the VA mode, a front surface of the alignment film is configured to allow the liquid crystal molecule 514 to have a pretilt angle of 2° to 6° (an angle relative to the normal direction of a substrate surface) across the entire surface of a display region.

In the liquid crystal panel in the VA mode, for example, disposing two polarization plates in crossed Nicols position allows for normally black display in which black is displayed when no voltage is applied and white is displayed when a voltage is applied.

Optical Action of Liquid Crystal Panel in Luminance Modulation Scheme

FIGS. 8 and 9 each illustrate an overview of a liquid crystal panel of a luminance modulation scheme as the light intensity modulation element 501. FIG. 8 schematically illustrates a configuration of the light intensity modulation element 501 as viewed from the front and the polarization state of light. FIG. 9 schematically illustrates a configuration of the light intensity modulation element 501 in a cross-section and the polarization state of light. It is to be noted that FIGS. 8 and 9 each illustrate a configuration example of a case where the light intensity modulation element 501 is a transmissive liquid crystal panel in the VA mode.

With respect to the light intensity modulation element 501, the polarizer 521 as an incident-side polarization plate is disposed in a light incident direction, and the analyzer 522 as an output-side polarization plate is disposed in a light output direction. The light intensity modulation element 501 has a configuration in which the liquid crystal layer 513 is interposed between a plurality of pixel electrodes 511 and a plurality of pixel electrodes 512 that are opposed to each other. The liquid crystal layer 513 include the plurality of liquid crystal molecules 514. In the liquid crystal layer 513, the plurality of liquid crystal molecules 514 is arranged to be aligned in a predetermined alignment direction.

The polarizer 521 outputs polarized light L12, of non-polarized incident light L11, polarized in a predetermined polarization direction. For example, as illustrated in FIG. 8, the alignment direction of the liquid crystal molecules 514 is a direction tilted by 45° relative to a polarization direction of the polarized light L12 as viewed from the front. As illustrated in FIG. 9, the tilt of the liquid crystal molecule 514 in the cross-section changes depending on the voltage applied between the pixel electrode 511 and the pixel electrode 512 that are opposed to each other. This causes a polarization state of intensity modulation light L13 outputted from the light intensity modulation element 501 to change depending on the applied voltage. A light amount of light finally outputted from the analyzer 522 changes depending on the polarization state of the intensity modulation light L13.

In the luminance modulation scheme, the polarization of light is utilized to express gradation characteristics. The change in the polarization state of the intensity modulation light L13 outputted from the light intensity modulation element 501 causes the luminance for each pixel to change. FIG. 9 illustrates how the incident polarized light L12 of linear polarization is changed when the liquid crystal molecule 514 is tilted due to the application of the voltage, and how the luminance is changed under a condition that the two polarization plates (the polarizer 521 and the analyzer 522) are arranged in a crossed Nicols manner.

In FIG. 9, the luminance of light passing through each region of regions (1) to (3) is represented by luminance $\propto \sin^2(\Delta n d\pi/\lambda)$. Here, $\Delta n$ denotes a refractive index anisotropy of the liquid crystal molecule 514, d denotes a cell gap (thickness of the liquid crystal layer 513), and $\lambda$ denotes a wavelength of the incident light L11. When $\Delta n d\pi/\lambda = \pi/2$, i.e., $\Delta n d = \lambda/2$ holds true, the maximum luminance is obtained.

In the region (1), the liquid crystal layer 513 is in a state where no voltage is applied thereto. The liquid crystal molecules 514 are in a state of being aligned substantially perpendicular to a substrate of the liquid crystal panel. The polarized light L12 of linear polarization having entered the liquid crystal layer 513 passes through the liquid crystal layer 513 without being substantially influenced by the liquid crystal molecule 514. Under the condition that the two polarization plates are arranged in a crossed Nicols manner, the final output light is displayed in black.

In the region (2), the liquid crystal layer 513 is in a state where a certain degree of voltage is applied thereto, and the liquid crystal molecules 514 are in a state of being tilted to some degree relative to the substrate of the liquid crystal panel. In a case where the liquid crystal molecule 514 is tilted to some degree in this manner, the polarization state of the polarized light L12 having entered the liquid crystal layer 513 is changed from linear polarization to elliptic polarization due to generation of a phase difference. Under the condition that the two polarization plates are arranged in a crossed Nicols manner, the final output light is displayed in gray (halftone) because light that is able to pass through the analyzer 522 and light that is not able to pass therethrough are present in a mixed manner.

In the region (3), the liquid crystal layer 513 is in a state where a higher voltage than that in the region (2) is applied thereto, and the liquid crystal molecules 514 are in a state of being aligned substantially parallel to the substrate of the liquid crystal panel. In this case, the refractive index anisotropy $\Delta n$ of the liquid crystal molecule 514 is maximized; in the case where $\Delta n d = \lambda/2$ is set, the polarized light L12 having entered the liquid crystal layer 513 is linearly polarized light rotated by 90° in the liquid crystal layer 513. Under the condition where the two polarization plates are arranged in a crossed Nicols manner, the intensity modulation light L13 passes through the analyzer 522, and the final output light is displayed in white.

Optical Action of Liquid Crystal Panel of Phase Modulation Scheme

FIGS. 10 and 11 each illustrate an overview of a liquid crystal panel of a phase modulation scheme as the optical phase modulation element 1. FIG. 10 schematically illustrates a configuration of the optical phase modulation element 1 as viewed from the front and the polarization state of light. FIG. 11 schematically illustrates a configuration of the optical phase modulation element 1 in the cross-section and the polarization state of light. It is to be noted that FIGS. 10 and 11 each illustrate a configuration example in a case where the optical phase modulation element 1 is the transmissive liquid crystal panel in the VA mode.

In FIG. 11, similarly to the configuration of the luminance modulation scheme in FIG. 9, with respect to the optical phase modulation element 1, the polarizer 521 is disposed in a light incident direction, whereas the analyzer 522 is not disposed in the light output direction. Similarly to the configuration of the luminance modulation scheme in FIG. 9, the optical phase modulation element 1 has a configuration in which the liquid crystal layer 513 is interposed between the plurality of pixel electrodes 511 and the plurality of pixel electrodes 512 that are opposed to each other. The liquid crystal layer 513 includes the plurality of liquid crystal molecules 514. In the liquid crystal layer 513, the plurality of liquid crystal molecules 514 are arranged to be aligned in a predetermined alignment direction.

The polarizer 521 outputs the polarized light L12, of the non-polarized incident light L11, polarized in a predetermined polarization direction. For example, as illustrated in FIG. 10, the alignment direction of the liquid crystal molecules 514 is a direction parallel to the polarization direction of the polarized light L12 as viewed from the front. As illustrated in FIG. 11, the tilt of the liquid crystal molecule 514 in the cross-section changes depending on the voltage applied between the pixel electrode 511 and the pixel electrode 512 that are opposed to each other. This causes a phase of phase modulation light L14 finally outputted from the optical phase modulation element 1 changes depending on the applied voltage.

In the liquid crystal panel of the phase modulation scheme, only the phase of light is changed by the tilt of the liquid crystal molecule 514, with no polarization being changed, and thus the luminance is not changed. FIG. 11 illustrates how the incident polarized light L12 of linear polarization is changed and how the phase is changed, when the liquid crystal molecule 514 is tilted.

As illustrated in FIG. 10, a case is considered where the polarized light L12 of linear polarization enters the liquid crystal panel in a manner to coincide with the director of the molecule 514. In FIG. 11, as for a phase of light passing through each region of the regions (1) to (3), the phase changes by one wavelength when $\Delta nd=\lambda$ holds true.

In the region (1), the liquid crystal layer 513 is in a state where no voltage is applied thereto. The liquid crystal molecules 514 are in a state of being aligned substantially perpendicular to the substrate of the liquid crystal panel. The polarization direction of the polarized light L12 of linear polarization having entered the liquid crystal layer 513 coincides with the director of the liquid crystal molecule 514, and thus the polarization does not change. When the refractive index of the liquid crystal layer 513 in the region (1) is set as n1, a delay $\Delta nd$ of a phase of the output light from the optical phase modulation element 1 is n1d.

In the region (2), the liquid crystal layer 513 is in a state where a certain degree of voltage is applied thereto, and the liquid crystal molecules 514 are in a state of being tilted to some degree relative to the substrate of the liquid crystal panel. The polarization direction of the polarized light L12 of linear polarization having entered the liquid crystal layer 513 coincides with the director of the liquid crystal molecule 514, and thus the polarization does not change. In a case where the liquid crystal molecules 514 are tilted, the refractive index of the liquid crystal layer 513 in the region (2) is obtained by subtracting the refractive index no of the ordinary ray from the refractive index ne of the extraordinary ray caused by the tilt of the liquid crystal molecule 514. When the refractive index of the liquid crystal layer 513 in the region (2) is set as n2, the delay $\Delta nd$ of the phase of the output light from the optical phase modulation element 1 is n2d.

In the region (3), the liquid crystal layer 513 is in a state where a higher voltage than that in the region (2) is applied thereto, and the liquid crystal molecules 514 are in a state of being aligned substantially parallel to the substrate of the liquid crystal panel. The polarization direction of the polarized light L12 of linear polarization having entered the liquid crystal layer 513 coincides with the director of the liquid crystal molecule 514, and thus the polarization does not change. In a case where the liquid crystal molecules 514 are parallel to the substrate of the liquid crystal panel, the refractive index anisotropy $\Delta n$ of the liquid crystal molecule 514 is maximized. The refractive index of the liquid crystal layer 513 is obtained by subtracting the refractive index no of the ordinary ray from the refractive index ne of the extraordinary ray. When the refractive index of the liquid crystal layer 513 in the region (3) is set as n3, the delay $\Delta nd$ of the phase of the output light from the optical phase modulation element 1 is n3d. In a case where $\Delta nd=\lambda$ is set, when comparing the region (1) where the liquid crystal molecules 514 stand and the region (3) where the liquid crystal molecules 514 lie on with each other, the phase of phase modulation light L14 finally outputted from the optical phase modulation element 1 changes by one wavelength.

Single-Panel Type Color Optical Phase Modulation Element

PTLs 1 and 2 each propose a technique of generating, in a projector, illumination light of three primary colors (red, green, and blue) necessary for color display by using optical phase modulation elements that differ for respective colors. Meanwhile, PTL 3 proposes a technique of generating illumination light of three primary colors necessary for color display by using one optical phase modulation element (single-panel type color optical phase modulation element). FIG. 12 illustrates an overview of a single-panel type color optical phase modulation element 100 according to a comparative example.

In the single-panel type color optical phase modulation element 100, for example, one liquid crystal panel encapsulating a single liquid crystal material is divided, in a plane, into a red (R) region 110R, a green (G) region 110G, and a blue (B) region 110B, and the color regions are irradiated with respective color light beams of the colors of R, G, and B. Then, in each of the color regions, a phase distribution pattern (phase hologram) corresponding to a wavelength of each color light beam is calculated and displayed to thereby enable a desired reproduced image 100 to be obtained. This reproduced image 100 is usable as illumination light for the light intensity modulation element in a projector of the luminance modulation scheme.

However, the single-panel type color optical phase modulation element 100 according to the comparative example has a configuration in which the single liquid crystal material is encapsulated; therefore, phase modulation characteristics, light resistance, and the like differ in each color region of the R region 110R, the G region 110G, and the B region 110B due to the nature of liquid crystal materials, as described below. This leads to a decrease in performance and reliability. Hereinafter, description is given of issues for each color region.

R Region 110R: Phase Modulation Amount

FIG. 13 illustrates an example of wavelength dispersion characteristics of the refractive index anisotropy Δn of a typical liquid crystal material.

In general, as the wavelength becomes longer, the value of the refractive index anisotropy Δn becomes smaller in a liquid crystal material. That is, in a long-wavelength red light (near 630 nm), the refractive index anisotropy Δn of the liquid crystal material becomes small.

In order to perform 2π phase modulation in the optical phase modulation element, it is necessary that Δnd=λ hold true; therefore, it is necessary to first determine the refractive index anisotropy Δn at the wavelength in the R region 110R, as for the designed value of the refractive index anisotropy Δn of the liquid crystal material. In that case, it is sufficient Δnd=λ (550 nm) hold true for the B region 110B; however, when designing to match the value of the refractive index anisotropy Δn of the R region 110R, it follows that Δnd>λ (550 nm) holds true, which is over-engineered and requires the use of a liquid crystal material having high Δn, thus leading to a trade-off for light resistance. In addition, the response speed of a liquid crystal material depends on the viscosity of the liquid crystal material. As the viscosity of the liquid crystal material becomes higher, the response speed becomes slower. In general, a liquid crystal material having high Δn has high viscosity, which influences the response speed.

B Region 110B: Light Resistance Deterioration

The liquid crystal panel is deteriorated by blue light of a short wavelength. That is, in a case where the liquid crystal panel is irradiated with strong blue light for a long period of time, free radicals are generated from a sealing material or a sealant, which is a peripheral material dissolved in a liquid crystal material, or impurities from the environmental, etc. It is conceivable that the generated free radicals break chemical bonds of the liquid crystal material to thereby degrade the characteristics of the liquid crystal panel. That is, the light resistance is particularly an issue specific to the B region 110B; in a case of being used for the single-panel type color optical phase modulation element 100, there is a possibility that only the B region 110B may deteriorate locally. For this reason, high light resistance specialized for the B region 110B is necessary. It is effective to decrease the value of the refractive index anisotropy Δn in designing the liquid crystal material.

G Region 110G: Visibility of Image Quality Error

FIG. 14 illustrates an example of a relative luminous efficiency curve.

Human eyes differ in their perception of intensity of light beams depending on the wavelengths thereof, even when the light beams are of the same intensity, and this perception is modeled as a relative luminous efficiency curve. FIG. 14 illustrates a relative luminous efficiency curve at wavelengths of λ=380 nm to 780 nm which are perceivable by a human, in which the relative luminous efficiency of the wavelength of λ=555 nm is standardized as the maximum value. The luminous efficiency of a human for a green wavelength is high; therefore, when there is abnormality in a phase distribution pattern displayed in the G region 110G in the single-panel type color optical phase modulation element 100, it is difficult to cover up the abnormality, thus making it difficult to obtain the reproduced image 100 having a satisfactory display performance. Specifically, an injection port formed when injecting a liquid crystal material is sealed with a resin after the liquid crystal is encapsulated. When impurities from the sealant are undesirably exposed to the G region 110G, the G region 110G is locally deteriorated, which leads to insufficient display of the phase distribution pattern, thus making it difficult to obtain the reproduced image 100 having high quality.

1. First Embodiment

1.1 Overview (Planar Configuration Example of Optical Phase Modulation Element)

The basic structure of an optical phase modulation element according to a first embodiment of the present disclosure may have a configuration in which a liquid crystal material is encapsulated between a pair of substrates opposed to each other, for example, similarly to the optical phase modulation element 1 illustrated in FIG. 11. Similarly to the single-panel type color optical phase modulation element 100 according to the comparative example illustrated in FIG. 12, the optical phase modulation element according to the first embodiment is configured by one liquid crystal panel, and includes a plurality of color regions corresponding to respective color light beams. The optical phase modulation element according to the first embodiment is configured to be able to obtain the desired reproduced image 100 by displaying phase distribution patterns corresponding to wavelengths of respective color light beams in the respective color regions. The single-panel type color optical phase modulation element 100 according to the comparative example has a configuration in which a single liquid crystal material is encapsulated in one liquid crystal panel. Meanwhile, the optical phase modulation element according to the first embodiment has a configuration in which a plurality of liquid crystal materials is encapsulated therein. The optical phase modulation element according to the first embodiment includes a plurality of divided regions provided in different regions in an in-plane direction. Liquid crystal materials having different refractive index anisotropies Δn are encapsulated in the plurality of divided regions. Each of the plurality of divided regions displays a phase distribution pattern for at least one color having a different wavelength.

Hereinafter, description is given of a specific configuration example of the optical phase modulation element according to the first embodiment. It is to be noted that the following gives a configuration example in which the color regions for displaying phase distribution patterns correspond to three colors of R, G, and B; however, no limitation is made to these colors. In addition, the number of the color regions may be two, or four or more.

First Configuration Example

FIG. 15 schematically illustrates a first example of an in-plane structure of the optical phase modulation element according to the first embodiment. The configuration example illustrated in FIG. 15 corresponds to configurations of Example 1 and Example 4 described later.

An optical phase modulation element 1A illustrated in FIG. 15 includes a first divided region 21 and a second divided region 22 as the plurality of divided regions.

In the optical phase modulation element 1A, the first divided region 21 includes an R region (red region) 10R and a G region (green region) 10G. The R region 10R is illuminated by red light, e.g., from an unillustrated laser light source, and displays a red phase distribution pattern optimized for a peak wavelength of red light. The G region 10G is illuminated by green light, e.g., from an unillustrated laser light source, and displays a green phase distribution pattern optimized for a peak wavelength of green light.

The second divided region 22 includes a B region (blue region) 10B. The B region 10B is illuminated by blue light, e.g., from an unillustrated laser light source, and displays a blue phase distribution pattern optimized for a peak wavelength of blue light.

A seal 41 is formed on a periphery of each of the first divided region 21 and the second divided region 22 to separate the regions from each other. Respective liquid crystal materials having different refractive index anisotropies $\Delta n$ are encapsulated in the first divided region 21 and the second divided region 22. That is, in the optical phase modulation element 1A illustrated in FIG. 15, the liquid crystal material in the R region 10R and the G region 10G and the liquid crystal material in the B region 10B differ from each other.

It is desirable for the optical phase modulation element 1A to satisfy, in the same wavelength (e.g., $\lambda$=550 nm):

$$\Delta nR,G > \Delta nB$$

where $\Delta nR,G$ denotes a refractive index anisotropy of a liquid crystal material encapsulated in the first divided region 21, and $\Delta nB$ denotes a refractive index anisotropy of a liquid crystal material encapsulated in the second divided region 22.

That is, it is desirable to inject a liquid crystal material having high $\Delta n$ into the R region 10R and the G region 10G. It is desirable, in the first divided region 21, that the liquid crystal injection port be formed in the R region 10R and be sealed with a sealant 42. As a result, it is possible, in the first divided region 21, to achieve a sufficient phase modulation amount corresponding to the R region 10R, and to prevent local deterioration in the G region 10G due to impurities from the sealant 42. It is to be noted that using a drop injection process eliminates the need for the sealant 42. In this case, it is sufficient that effects of only the phase modulation amount in the R region 10R be expected. In the B region 10B, it is sufficient that a liquid crystal material in which $\Delta nd = \lambda$ holds true be selected in the vicinity of the peak wavelength of blue light (e.g., $\lambda$=450 nm). That is, it is possible to select a liquid crystal material having lower $\Delta n$ for the B region 10B, and thus it is advantageous for the light resistance. In addition, according to this configuration example, it is possible to achieve high quality only by changing sealing patterns without increasing the number of steps.

It is to be noted that respective areas of the R region 10R, the G region 10G, and the B region 10B may be the same, or may be different. In addition, the respective areas of the R region 10R, the G region 10G, and the B region 10B may be determined depending on the light amounts of light sources of the respective colors of R, G, and B. The light source is desirably a highly coherent laser light source; however, LED (Light Emitting Diode) or a phosphor light source may also be used.

Second Configuration Example

FIG. 16 schematically illustrates a second example of the in-plane structure of the optical phase modulation element according to the first embodiment. The configuration example illustrated in FIG. 16 corresponds to the configurations of Example 1 and Example 4 described later.

An optical phase modulation element 1B illustrated in FIG. 16 includes the first divided region 21, the second divided region 22, and a third divided region 23 as the plurality of divided regions.

In the optical phase modulation element 1B, the first divided region 21 includes the R region 10R. The R region 10R is illuminated by red light, e.g., from an unillustrated laser light source, and displays a red phase distribution pattern optimized for the peak wavelength of red light.

In the optical phase modulation element 1B, the second divided region 22 includes the G region 10G. The G region 10G is illuminated by green light, e.g., from an unillustrated laser light source, and displays a green phase distribution pattern optimized for the peak wavelength of green light.

In the optical phase modulation element 1B, the third divided region 23 includes the B region 10B. The B region 10B is illuminated by blue light, e.g., from an unillustrated laser light source, and displays a blue phase distribution pattern optimized for the peak wavelength of blue light.

The seal 41 is formed on a periphery of each of the first divided region 21, the second divided region 22, and the third divided region 23 to separate the regions from one another. Respective liquid crystal materials having different refractive index anisotropies $\Delta n$ are encapsulated in the first divided region 21, the second divided region 22, and the third divided region 23. That is, in the optical phase modulation element 1B illustrated in FIG. 16, the respective liquid crystal materials in the R region 10R, the G region 10G, and the B region 10B differ from one another. In each of the R region 10R, the G region 10G, and the B region 10B, the liquid crystal injection port is sealed with the sealant 42. It is to be noted that using the drop injection process eliminates the need for the sealant 42.

It is desirable for the optical phase modulation element 1B to satisfy, in the same wavelength (e.g., $\lambda$=550 nm):

$$\Delta nR \geq \Delta nG > \Delta nB$$

where $\Delta nR$ denotes a refractive index anisotropy of a liquid crystal material encapsulated in the first divided region 21, $\Delta nG$ denotes a refractive index anisotropy of a liquid crystal material encapsulated in the second divided region 22, and $\Delta nB$ denotes a refractive index anisotropy of a liquid crystal material encapsulated in the third divided region 23.

This makes it possible to achieve superior performance from the viewpoints of the light resistance, reliability, and phase modulation amount described above. The present configuration example has a merit of optimizing the liquid crystal material in each region of the R region 10R, the G region 10G, and the B region 10B.

It is to be noted that respective areas of the R region 10R, the G region 10G, and the B region 10B may be the same, or may be different. In addition, the respective areas of the R region the G region 10G, and the B region 10B may be determined depending on the light amounts of light sources of the respective colors of R, G, and B. The light source is desirably a highly coherent laser light source; however, LED or a phosphor light source may also be used.

Third Configuration Example

FIG. 17 schematically illustrates a third example of the in-plane structure of the optical phase modulation element according to the first embodiment. The configuration example illustrated in FIG. 17 corresponds to a configuration of Example 3 described later.

The basic configuration of an optical phase modulation element 1C illustrated in FIG. 17 is similar to that of the optical phase modulation element 1A illustrated in FIG. 15, but differs from that of the optical phase modulation element 1A illustrated in FIG. 15 in the areas of the respective divided regions. In the optical phase modulation element 1C illustrated in FIG. 17, the area of the second divided region 22 including the B region 10B is ⅓ or more of the entire in-plane effective display region. As described above, the B region 10B is likely to be deteriorated by blue light. As for the deterioration of the B region 10B, local deterioration occurs due to dispersion of in-plane incident light. Therefore, a larger area of the B region 10B enables a non-deteriorated region to be secured, thus making it possible to obtain a high-quality reproduced image for a longer period of time.

It is to be noted that, similarly also as for the optical phase modulation element 1B illustrated in FIG. 16, it is desirable that the area of the third divided region 23 including the B region 10B be ⅓ or more of the entire in-plane effective display region.

Fourth Configuration Example

In the optical phase modulation elements according to the first to third configuration examples, an alignment film may be formed on surfaces, in contact with the liquid crystal layer, of the substrates of the pair of substrates opposed to each other. In this case, the alignment film may be provided in a manner corresponding to each of the plurality of divided regions. In this case, a configuration may be adopted in which a plurality of alignment films including different materials is provided as the alignment film. For example, it is desirable to adopt an organic material as an alignment film corresponding to the divided region including the R region 10R and the G region 10G and to adopt an inorganic material as an alignment film corresponding to the divided region including the B region 10B. The division of each alignment film is implementable, for example, by dividing the step of the ink jet or the mask process. In particular, using the inorganic alignment film for the divided region including the B region 10B makes it possible to further enhance the light resistance.

Fifth Configuration Example

FIGS. 18 and 19 each schematically illustrate first and second modification examples of the in-plane structure of the optical phase modulation element according to the first embodiment.

For the optical phase modulation elements according to the first to fourth configuration examples, each of the plurality of divided regions may be structured to have a curved shape at least partially in an in-plane direction.

An optical phase modulation element 1D according to a first modification example illustrated in FIG. 18 has a configuration in which a portion of the first divided region 21 has a curved shape and the entire second divided region 22 has a curved shape, with respect to the configuration of the optical phase modulation element 1A illustrated in FIG. 15. In the optical phase modulation element 1D, the second divided region 22 is formed in an in-plane center region, and the seal 41 is formed around the second divided region 22, thereby allowing the second divided region 22 and the first divided region 21 to be divided from each other.

An optical phase modulation element 1E according to the second modification example illustrated in FIG. 19 has a configuration in which a portion of each of the first divided region 21 and the second divided region 22 has a curved shape and the entire third divided region 23 has a curved shape, with respect to the configuration of the optical phase modulation element 1B illustrated in FIG. 16. In the optical phase modulation element 1E, the third divided region 23 is formed in an in-plane center region, and the seal 41 is formed around the third divided region 23, thereby allowing the third divided region 23 to be divided from the first divided region 21 and the second divided region 22.

It is to be noted that the shapes of each divided region may be various shapes, in addition to the shapes illustrated in FIGS. 15 to 19. Enabling formation of each divided region with various shape patterns allows for higher degree of freedom of design, thus bringing advantages such as applicability of the technology of the present disclosure even in a case where there is a limitation for the arrangement of a light source, for example.

It is to be noted that, as for a method for injecting the liquid crystal material, only the process of ODF (One Drop Fill) may be used, in which a seal pattern is used to drop a liquid crystal material on one substrate, and another substrate is superposed and adhered onto the one substrate; alternatively, a vacuum injection process may be used, or a combination thereof processes may also be used. This makes it possible to adopt a configuration in which the sealant 42 is not used, for example, as in the optical phase modulation element 1D illustrated in FIG. 18.

Effects

As described above, according to the optical phase modulation element of the first embodiment, the liquid crystal materials having different refractive index anisotropies are encapsulated in each of the plurality of divided regions, and the respective divided regions display phase distribution patterns for colors having different wavelengths, thus making it possible to achieve high performance and high reliability.

According to the optical phase modulation element of the first embodiment, it is possible, for example, to secure a sufficient phase modulation amount in the R region 10R, and to suppress deterioration due to a temporal change in the B region 10B even when the optical phase modulation element is illuminated by a high-luminance RGB light source, which enables stable light control, thus making it possible to obtain a clear reproduced image.

It is to be noted that the effects described herein are merely illustrative and not limiting, and there may be other effects as well. The same applies to effects of the following other embodiments.

1.2 Configuration Example of Display Apparatus

As described above, the optical phase modulation element according to the first embodiment includes the plurality of color regions on which light beams of wavelengths of respective colors of R, G, and B are incident, and the respective color regions display phase distribution patterns optimized by the peak wavelengths of the respective colors. Examples of a method for calculating phase distribution data for displaying the phase distribution patterns include a diffraction type method in which a phase distribution is derived from a diffraction approximation and a refraction type method in which a phase distribution is derived as a free curved surface lens instead of diffraction; however, any calculation method may be used.

A highly coherent RGB laser is desirable as the light source, but LED or a phosphor may also be used. For example, the respective light beams of R, G, and B emitted from the light source are magnified by a collimator lens to be parallel light beams, which are used as illumination light beams for the respective color regions of the optical phase modulation element. Laser light having entered the optical phase modulation element is subjected to phase modulation to thereby allow a reproduced image to be displayed at a predetermined location. However, it is necessary to consider the difference in wavelengths to allow reproduced images to have the same size when the colors are combined. As for each pixel of the optical phase modulation element, it is possible to perform continuous phase modulation from 0 to $2\pi$ by controlling retardation of the liquid crystal depending on the inputted signal.

FIG. 20 schematically illustrates a configuration example of a projector 101 as a display apparatus using the optical phase modulation element according to the first embodiment.

The projector 101 includes an image signal output device 60, an intensity modulation pattern calculation circuit 61, a phase distribution pattern calculation circuit 62, an optical phase modulation element drive circuit 63, and a light intensity modulation element drive circuit 64. The projector 101 further includes an optical phase modulation element 10, a light source unit 30, a beam shaping optical system 32, a light intensity modulation element 51, and a polarization separation element (PBS) 52, and a projection lens 53.

The configuration example of FIG. 20 exemplifies the optical phase modulation element 10 configured by a reflective liquid crystal panel. The in-plane structure of the optical phase modulation element 10 may be any of the configurations in the configuration examples illustrated in FIGS. 15 to 19 described above. The optical phase modulation element 10 includes a plurality of color regions, and the color regions display phase distribution patterns optimized by peak wavelengths of the respective colors.

The light source unit 30 includes a plurality of light sources 31 having different peak wavelengths. The light source 31 is, for example, a laser light source. The beam shaping optical system 32 spatially separates and shapes color light beams of the respective peak wavelengths emitted from the light sources 31, and illuminates the color regions of the optical phase modulation element 10 with the color light beams of the respective peak wavelengths.

The image signal output device 60 outputs an image signal to each of the intensity modulation pattern calculation circuit 61 and the phase distribution pattern calculation circuit 62. The phase distribution pattern calculation circuit 62 calculates, on the basis of the image signal, a phase distribution pattern to be displayed by the optical phase modulation element 10. The phase distribution pattern to be displayed by the optical phase modulation element 10 is a phase distribution pattern that enables formation of an illumination image having a luminance distribution corresponding to an image to be displayed.

The phase distribution pattern calculation circuit 62 extracts a portion having a luminance level of a threshold or higher from the image signal, for example, and calculates a phase distribution pattern by iterative FFT (Fast Fourier Transform) computation. Here, the phase distribution pattern calculation circuit 62 holds, in advance, information on the peak wavelength of the light source unit 30 and information on division patterns of the respective color regions of the optical phase modulation element 10, and calculates, as the phase distribution pattern, phase distribution patterns optimized for the respective peak wavelengths and for the respective color regions. In addition, the phase distribution pattern calculation circuit 62 outputs an illumination light intensity modulation pattern signal to the intensity modulation pattern calculation circuit 61. The illumination light intensity modulation pattern signal represents information on the luminance distribution of the illumination image formed by the phase distribution pattern.

The optical phase modulation element drive circuit 63 drives the optical phase modulation element 10 to display the phase distribution pattern calculated by the phase distribution pattern calculation circuit 62. The intensity modulation pattern calculation circuit 61 calculates an intensity modulation pattern to generate an image to be displayed by the light intensity modulation element 51 on the basis of the image signal. At this time, the intensity modulation pattern calculation circuit 61 calculates an intensity modulation pattern in consideration of the information on the luminance distribution of the illumination image by the optical phase modulation element 10.

The light intensity modulation element drive circuit 64 drives the light intensity modulation element 51 to generate the intensity modulation pattern calculated by the intensity modulation pattern calculation circuit 61.

The polarization separation element 52 transmits a first polarization component of incident light, and reflects a second polarization component orthogonal to the first polarization component. The light intensity modulation element 51 is irradiated with the illumination image, as illumination light, formed by the optical phase modulation element 10 through the polarization separation element 52. The light intensity modulation element 51 performs intensity modulation on the illumination light on the basis of the intensity modulation pattern calculated by the intensity modulation pattern calculation circuit 61 to generate a projection image. As described above, the intensity modulation pattern calculated by the intensity modulation pattern calculation circuit 61 is obtained in consideration of the information on the luminance distribution of the illumination image by the optical phase modulation element 10, and thus the light intensity modulation element 51 consequently generates a projection image that reproduces the original image signal.

The projection image generated by the light intensity modulation element 51 is outputted by the polarization separation element 52 toward the projection lens 53. The projection lens 53 is a projection optical system including a plurality of lenses, and projects the projection image generated by the light intensity modulation element 51 onto a projection surface such as the screen 50.

1.3 Cross-Sectional Configuration Example of Optical Phase Modulation Element FIG. 21 schematically illustrates a cross-sectional configuration example of the optical phase modulation element according to the first embodiment.

The configuration example of FIG. 21 exemplifies an optical phase modulation element 201 configured by a reflective liquid crystal panel. The in-plane structure of the optical phase modulation element 201 illustrated in FIG. 21 may be any of the configurations in the configuration examples illustrated in FIGS. 15 to 19 described above. The optical phase modulation element 201 includes a plurality of color regions, and the respective color regions display phase distribution patterns optimized by peak wavelengths of the respective colors.

The optical phase modulation element 201 includes a glass substrate 210, a drive substrate 220, and a liquid crystal material 240. The liquid crystal material 240 is encapsulated between the glass substrate 210 and the drive substrate 220 by a sealant 230 and a spacer 231. The liquid crystal material 240 is, for example, a perpendicularly aligned liquid crystal.

The glass substrate 210 includes a transparent electrode 211 having light transmissivity. In the glass substrate 210, the transparent electrode 211 and an alignment film 212 are formed. Examples of the alignment film 212 to be used include an organic film of polyimide or the like, and an inorganic alignment film of $SiO_2$ (silicon oxide) or the like. The inorganic alignment film is desirable in terms of light resistance and heat resistance.

The drive substrate 220 includes a monocrystalline semiconductor substrate of silicon or the like including a light reflective electrode 221 having a pixel structure. In the drive substrate 220, a drive circuit, which includes a capacitor and a transistor including CMOS (Complementary Metal Oxide Semiconductor) or n-channel MOS (Metal Oxide Semiconductor), is formed in a monocrystalline silicon substrate. The pixel structure is formed using a metal film of Al (aluminum), Ag (silver), or the like on the drive circuit. As the light reflective electrode 221, the metal film serves both as a light reflective film and an electrode of a voltage to be applied to the liquid crystal material 240. In addition, an alignment film 222 is formed on a surface of the light reflective electrode 221. Examples of the alignment film 222 to be used include an organic film of polyimide or the like, and an inorganic alignment film of $SiO_2$ (silicon oxide) or the like. The inorganic alignment film is desirable in terms of light resistance and heat resistance.

1.4 Examples

FIG. 22 illustrates types of liquid crystal materials used in the optical phase modulation element according to each of Examples described below.

The optical phase modulation element according to the first embodiment includes the plurality of divided regions provided in different regions in an in-plane direction. Liquid crystal materials having different refractive index anisotropies $\Delta n$ are encapsulated in the plurality of divided regions. FIG. 22 illustrates values of the refractive index anisotropies $\Delta n$ for each of the wavelengths of R ($\lambda$=630 nm), G ($\lambda$=550 nm), and B ($\lambda$=450 nm) as characteristics of the respective liquid crystal materials A, B, and C used in each Example described below.

Example 1

The in-plane structure of an optical phase modulation element according to Example 1 is as illustrated in FIG. 15. FIG. 23 schematically illustrates an in-plane structure of an optical phase modulation element according to the comparative example. The optical phase modulation elements according to the comparative example and Example 1 are each configured by a liquid crystal panel. The optical phase modulation element according to Example 1 includes the first divided region 21 including the R region 10R and the G region 10G, and the second divided region 22 including the B region 10B. In contrast, the optical phase modulation element according to the comparative example includes no divided region, and is structured to include the R region 10R, the G region 10G, and the B region 10B within a single region.

FIG. 24 illustrates values of the cell gap d (thickness of liquid crystal layer) of the optical phase modulation elements according to the comparative example and Example 1 as well as the types and physical property values ($\Delta n$) of liquid crystal materials.

In the optical phase modulation elements according to the comparative example and Example 1, the liquid crystal materials used for the liquid crystal layers are each a nematic liquid crystal material having negative dielectric constant anisotropy.

In the optical phase modulation element according to the comparative example, the liquid crystal material A was injected into the entire in-plane region (R region 10R, G region 10G, and B region 10B) in the vacuum environment. In the optical phase modulation element according to Example 1, the liquid crystal material A was injected into the first divided region 21 (R region 10R and G region 10G), and the liquid crystal material B was injected into the second divided region 22 (B region 10B), in the vacuum environment. Thereafter, an injection port was sealed with the sealant 42 including a UV curable resin. It is to be noted that a configuration may also be adopted in which the injection port is not formed and the sealant 42 is not used. In this case, the method for injecting the liquid crystal involves using, for example, the ODF process in which a liquid crystal material is dropped on one substrate, and another substrate is superposed and adhered onto the one substrate.

Evaluation Results

Phase Modulation Amount

FIG. 25 illustrates voltage characteristics of a phase modulation amount of the optical phase modulation element according to the comparative example. FIG. 26 illustrates voltage characteristics of a phase modulation amount of the optical phase modulation element according to Example 1. FIG. 27 illustrates voltage values necessary for $2\pi$ modulation of a phase in the optical phase modulation elements according to the comparative example and Example 1.

FIGS. 25 and 26 each illustrate measurement results of the phase modulation amount for each color region at 5 V. FIG. 27 illustrates voltage values for each color region necessary for $2\pi$ modulation of a phase, obtained from the measurement results in FIGS. 25 and 26. In the optical phase modulation element according to the comparative example, the same liquid crystal material is used for each color region, and thus the value of the refractive index anisotropy $\Delta n$ in the B region 10B is larger than those in the R region 10R and the G region 10G due to wavelength dispersion. However, $2\pi$ is sufficient for the phase modulation amount, so that a liquid crystal material having low $\Delta n$ is used only in the B region 10B, in the optical phase modulation element according to Example 1.

Light Resistance

Next, a light resistance test was performed. The optical phase modulation element of each of the comparative example and Example 1 was placed in a test machine for a liquid crystal projector, and the transmittance thereof in the B region 10B was measured. FIG. 28 illustrates results of the light resistance test in the optical phase modulation element according to the comparative example. FIG. 29 illustrates results of the light resistance test in the optical phase modulation element according to Example 1. In FIGS. 28 and 29, the vertical axis indicates the maximum transmittance of each of the optical phase modulation elements, and the horizontal axis indicates time-of-use (light-irradiation time). In the optical phase modulation element according to the comparative example, the transmittance in the B region 10B was significantly decreased with the passage of time. In contrast, in the optical phase modulation element according to Example 1, no decrease in the transmittance was observed. In the configuration of the optical phase modulation element according to Example 1, a liquid crystal material having a smaller refractive index anisotropy Δn is used in the B region 10B. It is considered generally that, as the refractive index anisotropy Δn becomes smaller, the liquid crystal material is less likely to photodegrade, and thus suffers less deterioration by light. According to the optical phase modulation element of Example 1, no deterioration due to long-term use is observed, thus making it possible to display a favorable phase distribution pattern.

Reliability Test

FIG. 30 illustrates results of a reliability test in the optical phase modulation elements according to the comparative example and Example 1. FIG. 30 illustrates results of an acceleration test under high temperature and high humidity with environmental test conditions at 60° C. and 90%. When an image was reproduced from a phase distribution pattern, a favorable clear image was obtained even after 500 hours have elapsed in the optical phase modulation element according to Example 1. Using a structure that does not bring the sealant 42 into contact to avoid distinct deterioration of the G region 10G makes it possible to display a favorable phase distribution pattern.

Example 2

The in-plane structure of an optical phase modulation element according to Example 2 is as illustrated in FIG. 16. The in-plane structure of the optical phase modulation element according to the comparative example is as illustrated in FIG. 23. The optical phase modulation elements according to the comparative example and Example 2 are each configured by a liquid crystal panel. The optical phase modulation element according to Example 2 includes the first divided region 21 including the R region 10R, the second divided region 22 including the G region 10G, and the third divided region 23 including the B region 10B. In contrast, the optical phase modulation element according to the comparative example includes no divided region, and is structured to include the R region 10R, the G region 10G, and the B region 10B within a single region.

FIG. 24 illustrates values of the cell gap d (thickness of liquid crystal layer) of the optical phase modulation elements according to the comparative example and Example 2 as well as the types and physical property values (Δn) of liquid crystal materials.

In the optical phase modulation elements according to the comparative example and Example 2, the liquid crystal materials used for the liquid crystal layers are each a nematic liquid crystal material having negative dielectric constant anisotropy.

In the optical phase modulation element according to the comparative example, the liquid crystal material A was injected into the entire in-plane region (R region 10R, G region 10G, and B region 10B) in the vacuum environment. In the optical phase modulation element according to Example 2, the liquid crystal material A was injected into the first divided region 21 (R region 10R), the liquid crystal material C was injected into the second divided region 22 (G region 10G), and the liquid crystal material B was injected into the third divided region 23 (B region 10B), in the vacuum environment. Thereafter, an injection port was sealed with the sealant 42 including a UV curable resin. It is to be noted that a configuration may also be adopted in which the injection port is not formed and the sealant 42 is not used. In this case, the method for injecting the liquid crystal involves using, for example, the ODF process in which a liquid crystal material is dropped on one substrate, and another substrate is superposed and adhered onto the one substrate.

Evaluation Results

Phase Modulation Amount

FIG. 32 illustrates voltage characteristics of a phase modulation amount of the optical phase modulation element according to the comparative example. FIG. 33 illustrates voltage characteristics of a phase modulation amount of the optical phase modulation element according to Example 2. FIG. 34 illustrates voltage values necessary for $2\pi$ modulation of a phase in the optical phase modulation elements according to the comparative example and Example 2.

FIGS. 32 and 33 each illustrate measurement results of the phase modulation amount for each color region at 5 V. FIG. 34 illustrates voltage values for each color region necessary for $2\pi$ modulation of a phase, obtained from the measurement results in FIGS. 32 and 33. In the optical phase modulation element according to the comparative example, the same liquid crystal material is used for each color region, and thus the values of the refractive index anisotropies Δn in the B region 10B and the G region 10G are larger than that in the R region 10R due to wavelength dispersion. However, $2\pi$ is sufficient for the phase modulation amount, so that a liquid crystal material having lower Δn is used in the B region 10B and the G region 10G, as compared with the R region 10R, in the optical phase modulation element according to Example 2.

Light Resistance

Next, a light resistance test was performed. The optical phase modulation element of each of the comparative example and Example 2 was placed in a test machine for a liquid crystal projector, and the transmittance thereof in the B region 10B was measured. FIG. 35 illustrates results of the light resistance test in the optical phase modulation element according to the comparative example. FIG. 36 illustrates results of the light resistance test in the optical phase modulation element according to Example 2. In FIGS. 35 and 36, the vertical axis indicates the maximum transmittance of each of the optical phase modulation elements, and the horizontal axis indicates time-of-use (light-irradiation time). In the optical phase modulation element according to the comparative example, the transmittance in the B region 10B was significantly decreased with the passage of time. In contrast, in the optical phase modulation element according to Example 2, no decrease in the transmittance was observed. In the configuration of the optical phase modulation element according to Example 2, a liquid crystal material having a smaller refractive index anisotropy Δn is used in the B region 10B. It is considered generally that, as the refractive index anisotropy Δn becomes smaller, the liquid crystal material is less likely to photodegrade, and thus suffers less deterioration by light. According to the optical phase modulation element of Example 2, no deterioration due to long-term use is observed, thus making it possible to display a favorable phase distribution pattern.

Example 3

The in-plane structure of an optical phase modulation element according to Example 3 is as illustrated in FIG. 17. FIG. 23 schematically illustrates the in-plane structure of the optical phase modulation element according to the comparative example. The optical phase modulation elements according to the comparative example and Example 3 are each configured by a liquid crystal panel. The optical phase modulation element according to Example 3 includes the first divided region 21 including the R region 10R and the G region 10G, and the second divided region 22 including the B region 10B. In contrast, the optical phase modulation element according to the comparative example includes no divided region, and is structured to include the R region 10R, the G region 10G, and the B region 10B within a single region. In addition, in the optical phase modulation element according to Example 3, the area of the second divided region 22 including the B region 10B is ⅓ or more of the entire in-plane effective display region.

FIG. 37 illustrates values of the cell gap d (thickness of liquid crystal layer) of the optical phase modulation elements according to the comparative example and Example 3 as well as the types and physical property values (Δn) of liquid crystal materials.

In the optical phase modulation elements according to the comparative example and Example 3, the liquid crystal materials used for the liquid crystal layers are each a nematic liquid crystal material having negative dielectric constant anisotropy.

In the optical phase modulation element according to the comparative example, the liquid crystal material A was injected into the entire in-plane region (R region 10R, G region 10G, and B region 10B) in the vacuum environment. In the optical phase modulation element according to Example 3, the liquid crystal material A was injected into the first divided region 21 (R region 10R and G region 10G), and the liquid crystal material B was injected into the second divided region 22 (B region 10B), in the vacuum environment. Thereafter, an injection port was sealed with the sealant 42 including a UV curable resin. It is to be noted that a configuration may also be adopted in which the injection port is not formed and the sealant 42 is not used. In this case, the method for injecting the liquid crystal involves using, for example, the ODF process in which a liquid crystal material is dropped on one substrate, and another substrate is superposed and adhered onto the one substrate.

Evaluation Results

Phase Modulation Amount

FIG. 38 illustrates voltage characteristics of a phase modulation amount of the optical phase modulation element according to the comparative example. FIG. 39 illustrates voltage characteristics of a phase modulation amount of the optical phase modulation element according to Example 3. FIG. 40 illustrates voltage values necessary for 2π modulation of a phase in the optical phase modulation elements according to the comparative example and Example 3.

FIGS. 38 and 39 each illustrate measurement results of the phase modulation amount for each color region at 5 V. FIG. 40 illustrates voltage values for each color region necessary for 2π modulation of a phase, obtained from the measurement results in FIGS. 38 and 39. In the optical phase modulation element according to the comparative example, the same liquid crystal material is used for each color region, and thus the value of the refractive index anisotropy Δn in the B region 10B is larger than those in the R region 10R and the G region 10G due to wavelength dispersion. However, 2π is sufficient for the phase modulation amount, so that a liquid crystal material having low Δn is used only in the B region 10B, in the optical phase modulation element according to Example 3.

Light Resistance

Next, a light resistance test was performed. The optical phase modulation element of each of the comparative example and Example 3 was placed in a test machine for a liquid crystal projector, and the transmittance thereof in the B region 10B was measured. FIG. 28 illustrates results of the light resistance test in the optical phase modulation element according to the comparative example. FIG. 41 illustrates results of the light resistance test in the optical phase modulation element according to Example 3. In FIG. 41, the vertical axis indicates the maximum transmittance of each of the optical phase modulation elements, and the horizontal axis indicates time-of-use (light-irradiation time). In the optical phase modulation element according to the comparative example, the transmittance in the B region 10B was significantly decreased with the passage of time. In contrast, in the optical phase modulation element according to Example 3, no decrease in the transmittance was observed similarly to Example 1 (FIG. 29). In the configuration of the optical phase modulation element according to Example 3, a liquid crystal material having a smaller refractive index anisotropy Δn is used in the B region 10B similarly to the optical phase modulation element according to Example 1. It is considered generally that, as the refractive index anisotropy Δn becomes smaller, the liquid crystal material is less likely to photodegrade, and thus suffers less deterioration by light.

It was appreciated, however, that, when the irradiation time was extended to perform the test up to about a threefold period of time as compared with the comparative example, the transmittance in the B region 10B was gradually decreased even in the optical phase modulation element according to Example 3. That is, it is possible to extend the deterioration period by material design in the B region 10B; however, this is not permanent, and the deterioration will eventually occur.

FIG. 42 illustrates evaluation results of reproduced images in each of the optical phase modulation elements according to the comparative example, Example 1, and Example 3. FIG. 42 illustrates evaluation results of reproduced images that were reproduced at an initial stage and after a certain period of time. In the image quality ranking, five is the best, and a lower numerical value has a tendency of being worse.

In the optical phase modulation element according to the comparative example, image deterioration was confirmed at an early stage. In contrast, in the optical phase modulation element according to Example 1, the image was favorably viewed for a long period of time. In the optical phase modulation element according to Example 3, the image was viewed more favorably for a long period of time than in the optical phase modulation element according to Example 1. One reason for this is that, in the optical phase modulation element according to Example 3, the area of the B region 10B area is larger than that in the optical phase modulation element of Example 1. Due to dispersion of in-plane incident light in the optical phase modulation element, local deterioration occurs in a plane, resulting in increased deterioration at a center portion of each color region. That is, a larger area enables securing of a region where deterioration has not occurred, thus making it possible to obtain a high-quality reproduced image for a long period of time.

Example 4

An optical phase modulation element according to Example 4 is configured by a liquid crystal panel. The in-plane structure of the optical phase modulation element according to Example 4 is as illustrated in FIG. 15. The optical phase modulation element according to Example 4 differs from the optical phase modulation element according to Example 1 in the material of the alignment film. In the optical phase modulation element according to Example 1, the same material is used for the alignment film in all the color regions. In contrast, in the optical phase modulation element according to Example 4, polyimide, which is an organic material, is used for the alignment film corresponding to the divided region including the R region 10R and the G region 10G, and an inorganic material is used for the alignment film corresponding to the divided region including the B region 10B. In addition, in the optical phase modulation element according to Example 4, a positive liquid crystal material a was injected as the liquid crystal material into the R region 10R and the G region 10G, and a negative liquid crystal material B was injected into the B region 10B. Values of the refractive index anisotropies Δn of the liquid crystal material a is similar to those in the liquid crystal material A (see FIG. 22).

In the optical phase modulation element according to Example 4, the B region 10B was vapor-deposited with $SiO_2$, with the R region 10R and the G region 10G being masked. Thereafter, the R region 10R and the G region 10G were subjected to printing to enable formation of the polyimide material. As a matter of course, an inkjet process may also be used for the formation. Thereafter, the B region 10B was masked to go through an optical alignment process. As a matter of course, a mask rubbing method may also be used for the formation of the alignment. Thereafter, a seal pattern as in FIG. 15 was formed, the positive liquid crystal material a was injected into the R region 10R and the G region 10, and the negative liquid crystal material B was injected into the B region 10B.

FIG. 43 illustrates values of the cell gap d (thickness of liquid crystal layer) of the optical phase modulation element according to Example 4 as well as the types and physical property values (Δn) of liquid crystal materials.

In the optical phase modulation element according to Example 4, the liquid crystal material a was injected into the first divided region 21 (R region 10R and G region 10G), and the liquid crystal material B was injected into the second divided region 22 (B region 10B), in the vacuum environment. Thereafter, an injection port was sealed with the sealant 42 including a UV curable resin.

As a result, an optical phase modulation element with favorable image quality and better light resistance were abler to be achieved. In general, a polyimide alignment film with strong anchoring has better alignment, but is vulnerable to light. Using the polyimide alignment film for the G region 10G with high visibility allows for better alignment, thus making it possible to form a favorable phase distribution pattern, and to achieve a favorable reproduced image.

In addition, forming the inorganic alignment film with strong light resistance in the B region 10B makes it possible to reproduce a favorable reproduced image with no optical deterioration for a long period of time.

1.5 Modification Example

The above description has mentioned the configuration example in which the optical phase modulation element is applied to the display apparatus; however, the optical phase modulation element by the technology of the present disclosure is also applicable to apparatuses other than the display apparatus. For example, the optical phase modulation element by the technology of the present disclosure is also applicable to a laser beam machine. Examples of the laser beam machine include an apparatus that performs pattern working on a metal of an electrode, or the like by irradiation with laser light. In addition, the examples thereof include a laser soldering apparatus that performs soldering by irradiation with laser light.

FIG. 44 illustrates wavelength characteristics of light absorptivity in metals. As illustrated in FIG. 44, the wavelength characteristics of the light absorptivity differ depending on the type of metals. For example, as for gold (Au) and copper (Cu), the light absorptivity is higher when using a blue laser than using a near-infrared laser. For this reason, as for gold, copper, and the like, using the blue laser allows for higher working efficiency. In addition, because the wavelength characteristics of the light absorptivity differ depending on the type of metals, using a plurality of laser light beams having different wavelengths enables simultaneous working on a plurality of metals of different materials. In such a case, the optical phase modulation element by the technology of the present disclosure is used to generate a plurality of laser light patterns of different wavelengths, thereby enabling simultaneous working on a plurality of metals of different materials.

2. Practical Application Examples 2.1 First Practical Application Example

The technology according to the present disclosure is applicable to a variety of products. For example, the technology according to the present disclosure may be implemented as an apparatus to be mounted on any type of mobile body such as an automobile, an electric vehicle, a hybrid electric vehicle, a motorcycle, a bicycle, a personal mobility, an aircraft, a drone, a vessel, a robot, a construction machine, or an agricultural machine (a tractor).

FIG. 45 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 45, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 45 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 46 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 46 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 45, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 45, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 45 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the technology of the present disclosure can be applied to the display section 7720.

2.2 Second Practical Application Example

The technology according to the present disclosure may be applied to an endoscopic surgery system.

FIG. 47 is a view depicting an example of a schematic configuration of an endoscopic surgery system 5000 to which the technology according to an embodiment of the present disclosure can be applied. In FIG. 47, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

Supporting Arm Apparatus

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

Endoscope

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

Various Apparatus Incorporated in Cart

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

Supporting Arm Apparatus

The supporting arm apparatus 5027 includes the base unit 5029 serving as a base, and the arm unit 5031 extending from the base unit 5029. In the example depicted, the arm unit 5031 includes the plurality of joint portions 5033*a*, 5033*b* and 5033*c* and the plurality of links 5035*a* and 5035*b* connected to each other by the joint portion 5033*b*. In FIG. 47, for simplified illustration, the configuration of the arm unit 5031 is depicted in a simplified form. Actually, the shape, number and arrangement of the joint portions 5033*a* to 5033*c* and the links 5035*a* and 5035*b* and the direction and so forth of axes of rotation of the joint portions 5033*a* to 5033*c* can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033*a* to 5033*c*, and the joint portions 5033*a* to 5033*c* are configured such that they are rotatable around predetermined axes of rotation thereof by driving of the respective actuators. The driving of the actuators is controlled by the arm controlling apparatus 5045 to control the rotational angle of each of the joint portions 5033*a* to 5033*c* thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endo scope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033*a* to 5033*c* such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

Light Source Apparatus

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

Camera Head and CCU

Functions of the camera head 5005 of the endoscope 5001 and the CCU 5039 are described in more detail with reference to FIG. 48. FIG. 48 is a block diagram depicting an example of a functional configuration of the camera head 5005 and the CCU 5039 depicted in FIG. 47.

Referring to FIG. 48, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a flexible endoscopic system for inspection or a microscopic surgery system.

The technology according to the present disclosure is suitably applicable to the display apparatus 5041 among the configurations described above.

3. Other Embodiments

The technology by the present disclosure is not limited to the description of the foregoing embodiment, and may be modified and carried out in a wide variety of ways.

For example, the present technology may also have the following configurations.

According to the present technology of the following configurations, liquid crystal materials having different refractive index anisotropies are encapsulated in each of a plurality of divided regions, and the respective divided regions display phase distribution patterns for colors having different wavelengths, thus making it possible to achieve high performance and high reliability.

(1)
An optical phase modulation element including a plurality of divided regions provided in different regions in an in-plane direction and encapsulating a liquid crystal material having a different refractive index anisotropy, the plurality of divided regions each displaying a phase distribution pattern for a color having a different wavelength.

(2)
The optical phase modulation element according to (1), in which the plurality of divided regions includes a first divided region and a second divided region.

(3)
The optical phase modulation element according to (2), in which
the first divided region includes a red region that displays a red phase distribution pattern and a green region that displays a green phase distribution pattern, and
the second divided region includes a blue region that displays a blue phase distribution pattern.

(4)
The optical phase modulation element according to (3), in which $$\Delta nR,G > \Delta nB$$

is satisfied, for a refractive index anisotropy of a same wavelength,
where
$\Delta nR,G$ denotes a refractive index anisotropy of the liquid crystal material encapsulated in the first divided region, and
$\Delta nB$ denotes a refractive index anisotropy of the liquid crystal material encapsulated in the second divided region.

(5)
The optical phase modulation element according to (1), in which the plurality of divided regions includes a first divided region, a second divided region, and a third divided region.

(6)
The optical phase modulation element according to (5), in which
the first divided region includes a red region that displays a red phase distribution pattern,
the second divided region includes a green region that displays a green phase distribution pattern, and
the third divided region includes a blue region that displays a blue phase distribution pattern.

(7)
The optical phase modulation element according to (6), in which $$\Delta nR \geq \Delta nG > \Delta nB$$

is satisfied, in a same wavelength,
where
$\Delta nR$ denotes a refractive index anisotropy of the liquid crystal material encapsulated in the first divided region,
$\Delta nG$ denotes a refractive index anisotropy of the liquid crystal material encapsulated in the second divided region, and
$\Delta nB$ denotes a refractive index anisotropy of the liquid crystal material encapsulated in the third divided region.

(8)
The optical phase modulation element according to any one of (1) to (7), in which
one of the plurality of divided regions includes the blue region that displays the blue phase distribution pattern, and
the divided region including the blue region has an area that is ⅓ or more of an entire in-plane effective display region.

(9)
The optical phase modulation element according to any one of (1) to (8), further including a plurality of alignment films provided to correspond to the plurality of divided regions and including a different material.

(10)

The optical phase modulation element according to (9), in which
one of the plurality of divided regions includes the blue region that displays the blue phase distribution pattern, and
the alignment film, of the plurality of alignment films, corresponding to the divided region including the blue region includes an inorganic material.

(11)

The optical phase modulation element according to any one of (1) to (10), in which each of the plurality of divided regions has a curved shape at least partially in the in-plane direction.

(12)

A display apparatus including:
a light source unit that emits a plurality of color light beams having different wavelengths; and
an optical phase modulation element that performs phase modulation on each of the plurality of color light beams from the light source unit,
the optical phase modulation element including
a plurality of divided regions provided in different regions in an in-plane direction and encapsulating a liquid crystal material having a different refractive index anisotropy, the plurality of divided regions each displaying a phase distribution pattern for a color having a different wavelength.

(13)

The display apparatus according to (12), further including a light intensity modulation element that utilizes a reproduced image generated by the optical phase modulation element as illumination light, and performs intensity modulation on the illumination light to generate an image.

(14)

The display apparatus according to (13), further including a projection optical system that projects the image generated by the light intensity modulation element.

This application claims the benefit of Japanese Priority Patent Application JP2020-147720 filed with the Japan Patent Office on Sep. 2, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An optical phase modulation element, comprising:
a plurality of divided regions in different regions in an in-plane direction, wherein
each of the plurality of divided regions encapsulates a different liquid crystal material having a respective refractive index anisotropy,
each of the plurality of divided regions is configured to display a phase distribution pattern for a color having a different wavelength,
a divided region of the plurality of divided regions includes a blue region,
the blue region is configured to display a blue phase distribution pattern, and
an area of the blue region is more than ⅓ of an entire in-plane effective display region; and
a plurality of alignment films, wherein a material of each of the plurality of alignment films corresponding to each of the plurality of divided regions is different.

2. The optical phase modulation element according to claim 1, wherein the plurality of divided regions includes a first divided region and a second divided region.

3. The optical phase modulation element according to claim 2, wherein
the first divided region includes:
a red region configured to display a red phase distribution pattern, and
a green region configured to display a green phase distribution pattern, and
the second divided region includes the blue region.

4. The optical phase modulation element according to claim 3, wherein $$\Delta nR, G > \Delta nB$$

is satisfied, in a same wavelength, where
$\Delta nR, G$ denotes a refractive index anisotropy of a liquid crystal material encapsulated in the first divided region, and
$\Delta nB$ denotes a refractive index anisotropy of a liquid crystal material encapsulated in the second divided region.

5. The optical phase modulation element according to claim 1, wherein the plurality of divided regions includes a first divided region, a second divided region, and a third divided region.

6. The optical phase modulation element according to claim 5, wherein
the first divided region includes a red region configured to display that displays a red phase distribution pattern,
the second divided region includes a green region configured to display a green phase distribution pattern, and
the third divided region includes the blue region.

7. The optical phase modulation element according to claim 6, wherein $$\Delta nR \geq \Delta nG > \Delta nB$$

is satisfied, in a same wavelength, where
$\Delta nR$ denotes a refractive index anisotropy of a liquid crystal material encapsulated in the first divided region,
$\Delta nG$ denotes a refractive index anisotropy of a liquid crystal material encapsulated in the second divided region, and
$\Delta nB$ denotes a refractive index anisotropy of a liquid crystal material encapsulated in the third divided region.

8. The optical phase modulation element according to claim 1, wherein
an alignment film, of the plurality of alignment films, corresponding to the divided region including the blue region includes an inorganic material.

9. The optical phase modulation element according to claim 1, wherein each of the plurality of divided regions has a curved shape at least partially in the in-plane direction.

10. A display apparatus, comprising:
a light source unit configured to emit a plurality of color light beams having different wavelengths; and
an optical phase modulation element configured to perform phase modulation on each of the plurality of color light beams from the light source unit, wherein
the optical phase modulation element includes:
a plurality of divided regions in different regions in an in-plane direction, wherein each of the plurality of divided regions encapsulates a different liquid crystal material having a respective refractive index anisotropy, each of the plurality of divided regions is configured to display a phase distribution pattern for a color having a different wavelength, a divided region of the plurality of divided regions includes a blue region, the blue region is configured to display a blue phase distribution pattern, and an area of the blue region is more than $1/3$ of an entire in-plane effective display region; and a plurality of alignment films, wherein a material of each of the plurality of alignment films corresponding to each of the plurality of divided regions is different.

11. The display apparatus according to claim 10, further comprising a light intensity modulation element configured to:

utilize a reproduced image generated by the optical phase modulation element as illumination light; and perform intensity modulation on the illumination light to generate an image.

12. The display apparatus according to claim 11, further comprising a projection optical system configured to project the image generated by the light intensity modulation element.

* * * * *